US012762769B2

(12) United States Patent
Nishizawa

(10) Patent No.: US 12,762,769 B2
(45) Date of Patent: Oct. 13, 2026

(54) MARK SHEET IMAGE PROCESSING SYSTEM

(71) Applicant: KYOCERA Document Solutions Inc., Osaka (JP)

(72) Inventor: Akira Nishizawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 248 days.

(21) Appl. No.: 18/820,236

(22) Filed: Aug. 29, 2024

(65) Prior Publication Data

US 2025/0078239 A1 Mar. 6, 2025

(30) Foreign Application Priority Data

Aug. 30, 2023 (JP) ................................ 2023-140503

(51) Int. Cl.
*G06T 11/60* (2026.01)
*G06T 7/00* (2017.01)
*G06T 7/11* (2017.01)

(52) U.S. Cl.
CPC ............ *G06T 11/60* (2013.01); *G06T 7/0002* (2013.01); *G06T 7/11* (2017.01)

(58) Field of Classification Search
CPC ......... G06T 7/0002; G06T 7/11; G06T 11/60; G06T 7/62; G06T 7/73; G06T 2207/10024; G06V 30/10; G06V 30/1448; G06V 10/764
See application file for complete search history.

(56) References Cited

U.S. PATENT DOCUMENTS

2011/0200256 A1* 8/2011 Saubat ............... G06V 30/1448 382/195

FOREIGN PATENT DOCUMENTS

JP H11250173 A 9/1999

OTHER PUBLICATIONS

OMR literature review by Elias et al., Pub. 2021 (Year: 2021).*

* cited by examiner

*Primary Examiner* — Gregory A Morse
*Assistant Examiner* — Ty Mitchell Beatty
(74) *Attorney, Agent, or Firm* — Alleman Hall LLP

(57) ABSTRACT

An image processing system generates a first image by removing elements in contact with a boundary of a mark sheet area image from the mark sheet area image; generates a second image by removing from the first image elements whose area is equal to or smaller than a specific ratio (less than 1) of an area of an element having the largest area in the first image; identifies an element in the second image whose inside is not filled in as a blank frame; identifies, of elements within the mark sheet area image, an element whose position in a direction in which the frames are aligned with respect to the character string that represents an item is within a specific distance from the blank frame as a frame, and identifies a frame that has no corresponding blank frame as a filled-in frame, whose inside is filled in.

2 Claims, 16 Drawing Sheets

MARK SHEET IMAGE PROCESSING SYSTEM

INCORPORATION BY REFERENCE

This application is based upon and claims the benefit of priority from the corresponding Japanese Patent Application No. 2023-140503 filed on Aug. 30, 2023, the entire contents of which are incorporated herein by reference.

BACKGROUND

The present disclosure relates to an image processing system that determines whether or not a frame in an image of a mark sheet is filled in.

Conventionally, an image processing system is known in which, in an image of a mark sheet in which items are selected by filling in a frame, the image processing system determines whether or not the inside of a frame is filled in or not, and in a case in which a difference between a density value of a frame that has been filled in and a density value of a frame that has not been filled in is equal to or greater than a specific density value, the image processing system determines that the frame has been filled in.

However, in this conventional image processing system, an average density of each pixel row within the frame is calculated, and a maximum value is set as the density value within the frame, and thus, for example, in a case in which a large area within the frame is not filled in, such as in a case in which only one thin line segment extending in a direction perpendicular to a direction in which the pixel rows extend is drawn within the frame, or in a case in which a check mark or cross is placed in the frame, the density value within the frame becomes low, and as a result, there is a problem in that, although a person who filled in the frame may have intended to fill inside the frame, the image processing system is unable to properly identify a frame that has been filled in.

SUMMARY

In the image processing system according to the present disclosure, a mark sheet includes a plurality of sets of a character string representing an item, and a frame arranged in a first direction with respect to the character string and whose inside is filled in when the item represented by the character string is selected, the plurality of sets being arranged in a second direction perpendicular to the first direction. The image processing system identifies a filled-in frame, which is a frame whose inside is filled in, from an area image that is an image of the area among images read from the mark sheet by an image reading device. The image processing system generates a first image by removing from the area image at least elements that are in contact with a boundary of the area image; generates a second image by removing from the first image at least elements whose area is equal to or smaller than a specific ratio (less than 1) of an area of the largest element in the first image; identifies an element in the second image as a blank frame, whose inside is not filled in; identifies an element among elements in the region image whose position in the first direction is within a specific distance of the position of the blank frame as the frame; and identifies the frame for which there is no corresponding blank frame within the specific distance as the filled-in frame.

The image processing system according to the present disclosure identifies the item corresponding to the filled-in frame based on a list indicating correspondence between a position of the frame among a plurality of the frames in the area, and the item, and a position in the second direction of the filled-in frame among the plurality of frames in the area.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment according to the present disclosure will be described with reference to the drawings.

First, a configuration of an image processing system according to the present embodiment will be described.

Figure 1:
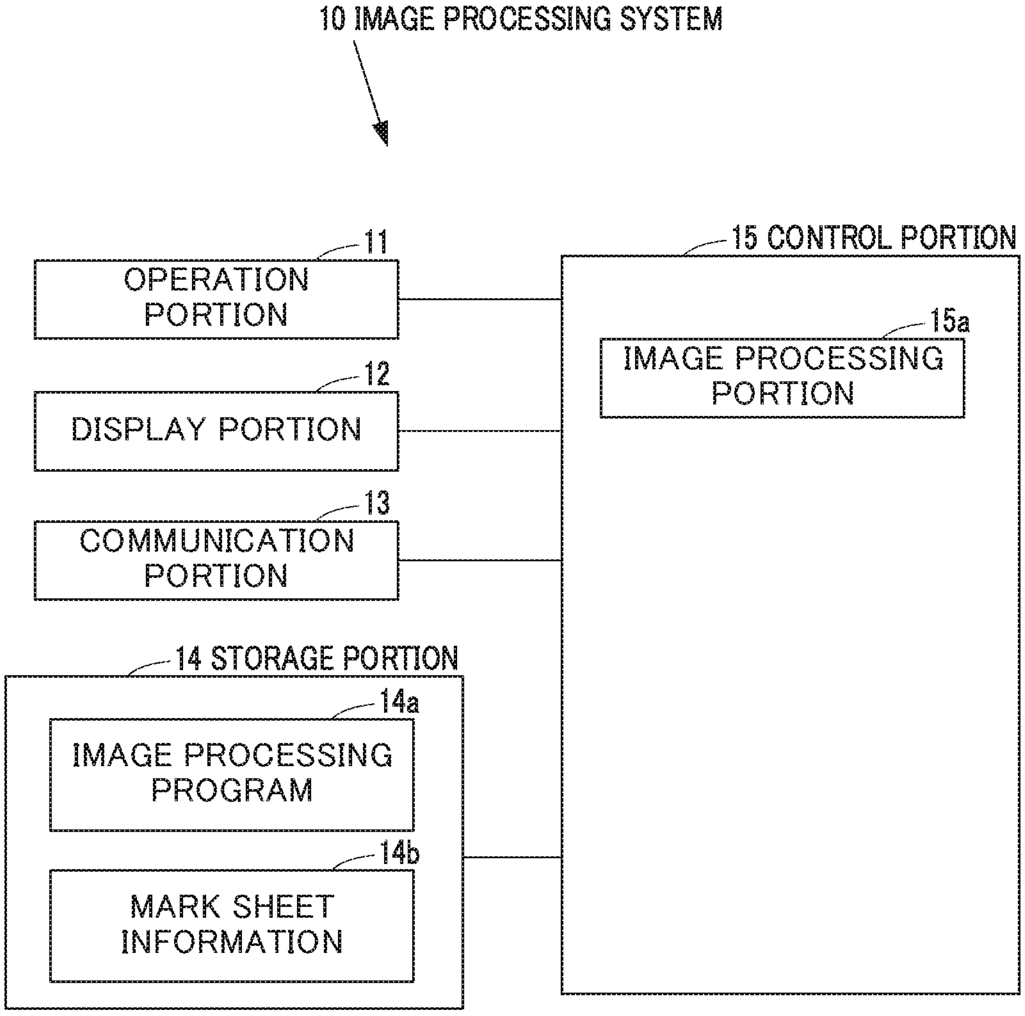
FIG. 1 is a block diagram of an image processing system of an embodiment according to the present disclosure when configured with one computer.

FIG. 1 is a block diagram of an image processing system 10 according to the present embodiment in a case of being configured with one computer.

As illustrated in FIG. 1. the image processing system 10 includes: an operation portion 11, which is, for example, an operation device such as a keyboard and a mouse through which various types of operations are input; a display portion 12, which is a display device such as a liquid crystal display (LCD) that displays various types of information; a communication portion 13, which is a communication device that communicates with an external device via a network such as a local area network (LAN) or the Internet, or directly by wire or wirelessly without using a network; a storage portion 14, which is a non-volatile storage device such as a semiconductor memory or a hard disk drive (HDD) that stores various types of information; and a control portion 15 that controls the entire image processing system 10. The image processing system 10 may be configured, for example, by a personal computer (PC). The image processing system 10 may be located on the cloud.

Figure 2:
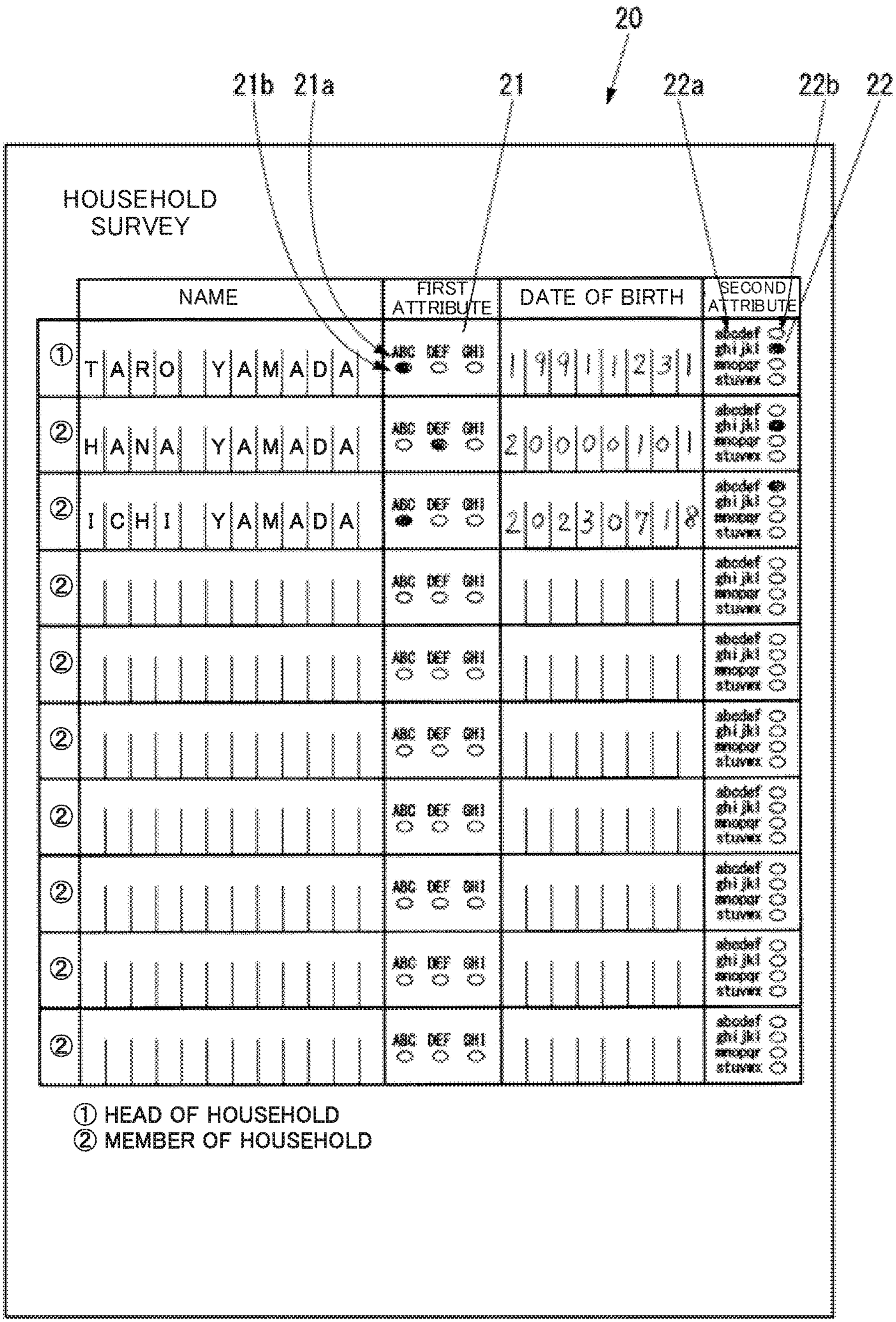
FIG. 2 is a diagram showing an example of a mark sheet that is handled by the image processing system shown in FIG. 1.

FIG. 2 is a diagram showing an example of a mark sheet that the image processing system 10 handles.

The mark sheet 20 shown in FIG. 2 includes, as areas in which items are selected by filling in a frame (hereinafter referred to as the "mark sheet areas"), a plurality of areas: a first attribute mark sheet area 21 in which first attribute items are selected; and a second attribute mark sheet area 22 in which second attribute items are selected.

The first attribute mark sheet area 21 includes a plurality of left-right arranged sets of a character string 21*a* representing an item of a first attribute; and a frame 21*b* arranged immediately below the character string 21*a* that is filled in when the item represented by the character string 21*a* immediately above is selected. The first attribute mark sheet area 21 has "ABC", "DEF" and "GHI" as items of the first attribute.

The second attribute mark sheet area 22 includes a plurality of up-down arranged sets of a character string 22*a* representing an item of a second attribute and a frame 22*b* arranged immediately to the right of the character string 22*a*, the inside of which is filled in when the item represented by the character string 22*a* immediately to the left is selected. The second attribute mark sheet area 22 has "abcdef", "ghijkl", "mnopqr" and "stuvwx" as items of the second attribute.

As shown in FIG. 1, the storage portion 14 can store an image processing program 14*a* for executing a specific process on an input image and outputting the result of the process. The image processing program 14*a* may be installed, for example, in the image processing system 10 during the manufacturing stage of the image processing system 10, or may be additionally installed in the image processing system 10 from an external storage medium such as a universal serial bus (USB) memory, or may be additionally installed in the image processing system 10 from a network.

The storage portion 14 is capable of storing mark sheet information 14*b* that indicates, for each mark sheet area, the position of each mark sheet area on the mark sheet 20 (see FIG. 2), the arrangement direction of the frames in each mark sheet area, a list indicating which frame in each mark sheet area corresponds to which item (hereinafter referred to as the "frame item correspondence list"), and the range of the number of frames that are filled in (hereinafter referred to as "filled-in frames") permitted in each mark sheet area.

The arrangement direction of the frames in the mark sheet area is left-right when the mark sheet area is the first attribute mark sheet area 21 (see FIG. 2), and is up-down when the mark sheet area is the second attribute mark sheet area 22 (see FIG. 2).

The frame item correspondence list is a list that indicates, from among a plurality of frames in the mark-sheet area, the correspondence between the positions of frames in the arrangement direction of the frames and the items. The frame item correspondence list is a list in which, when the mark sheet area is the first attribute mark sheet area 21, the first frame from the left corresponds to the item "ABC", the second frame from the left corresponds to the item "DEF", and the third frame from the left corresponds to the item "GHI", and is a list in which, when the mark sheet area is the second attribute mark sheet area 22, the first frame from the top corresponds to the item "abcdef", the second frame from the top corresponds to the item "ghijkl", the third frame from the top corresponds to the item "mnopqr", and the fourth frame from the top corresponds to the item "stuvwx".

The control portion 15 includes, for example, a central processing unit (CPU), a read only memory (ROM) that stores programs and various types of data, and a random access memory (RAM) that serves as a memory used as a working area for the CPU of the control portion 15. The CPU of the control portion 15 executes a program stored in the storage portion 14 or the ROM of the control portion 15.

The control portion 15, by executing the image processing program 14*a*, achieves an image processing portion 15*a* that executes a specific process on an input image and outputs the result of the process.

As methods for inputting an image to the image processing system 10, for example, there is a method in which, when image data is input to a specific folder monitored by the image processing system 10, the image processing system 10 acquires the image data from the folder; a method in which image data read from a document by an image reading device such as a multifunction peripheral (MFP) or a dedicated scanner is transmitted from the image reading device to the image processing system 10; a method in which, when an e-mail including image data arrives at an e-mail address monitored by the image processing system 10, the image processing system 10 acquires the image data from the e-mail; a method in which image data is transmitted from a web browser of a computer such as a PC to the image processing system 10 and to a website provided by the image processing system 10; and a method for transmitting image data from a dedicated application installed on a mobile device such as a smartphone to the image processing system 10.

As specific processes performed on an image by the image processing system 10 there is, for example, a process for identifying an item corresponding to a filled-in frame from an image read from a mark sheet by an image reading device (hereinafter referred to as a "mark sheet image").

As methods for transmitting execution results from the image processing system 10, there is, for example, a method for inputting execution results to a specific cloud service, a method for inputting the execution results to a specific folder; and a method for transmitting an e-mail including the execution results to a specific e-mail address.

Next, an operation of the image processing system 10 when identifying an item corresponding to a filled-in frame from a mark sheet image will be described.

The mark sheet image that is a target from which the image processing system 10 identifies the items corresponding to the filled-in frames is input to the image processing system 10 by, for example, any of the input methods described above.

In the following description, a mark sheet image read from a mark sheet 20 (see FIG. 2) by an image reading device will be described as an example of the mark sheet image that is a target from which the image processing system 10 identifies the items corresponding to the filled-in frames. The mark sheet image read from the mark sheet 20 by the image reading device may be either a color image or a monochrome image.

Figure 3:
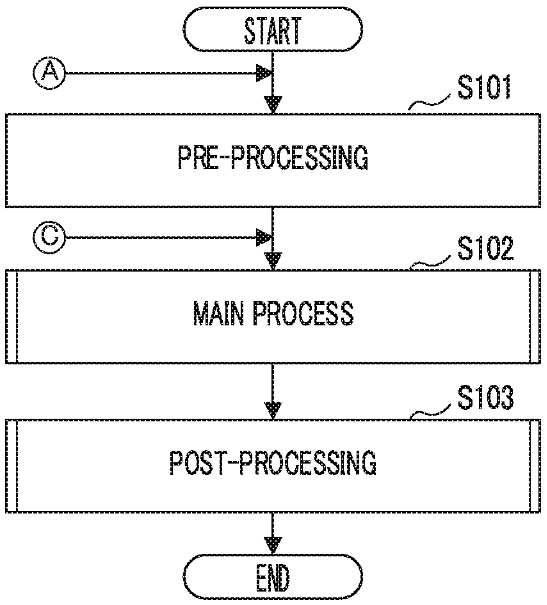
FIG. 3 is a flowchart of an operation of the image processing system shown in FIG. 1 in a case of identifying an item corresponding to a filled-in frame from a mark sheet image.

FIG. 3 is a flowchart of an operation of the image processing system 10 in a case of identifying items corresponding to filled-in frames from a mark sheet image.

When a mark sheet image is input to the image processing system 10, the image processing portion 15*a* executes the operation shown in FIG. 3.

As shown in FIG. 3, the image processing portion 15*a* executes various types of pre-processing steps on the mark sheet image input to the image processing system 10 (hereinafter referred to as the "input mark sheet image") in order to improve the accuracy of identifying items corresponding to filled-in frames from the mark sheet image (S101).

In S101, as pre-processing, the image processing portion 15*a* executes as necessary: "noise removal" for removing noise from the input mark sheet that could prevent identification of items that correspond to the filled-in frames from the mark sheet; in a case in which an alpha channel is included in the input mark sheet, "alpha channel removal" for removing the alpha channel from the input mark sheet or for performing re-rasterizing; in a case in which the input mark sheet is a color image, "grayscale conversion (achromatic conversion)" to achromatize the input mark sheet image; in a case in which the input mark sheet image is a multi-value image input, and a brightness range of the entire input mark sheet image is too narrow or too biased, "light and dark correction" for correcting the range and distribution of brightness in the input mark sheet image; in a case in which the input mark sheet image is slightly tilted, rotated, or distorted, "frontalization, leveling (rotation/distortion) correction" for correcting this, and for correcting the shape of the input mark sheet image to make the mark sheet look like a rectangle when viewed from the front; "blur correction" for correcting blur in input mark sheet image; "target area (mark sheet area block) search and extraction process" for extracting an image of the mark sheet area (hereinafter referred to as "mark sheet area image") from within the page of the input mark sheet image; and even in a case of scanning the same type of mark sheet, due to differences in the print width of the printer used when printing the mark sheet, differences in the printer driver settings, differences in the scan width of the scanner, differences in the scanner driver settings, or the like, the pixel size of the image may vary by a few percent compared to the document width, and thus "image size normalization" for correcting this and performing normalization to unify or suppress the amount of variation.

In a case in which the input mark sheet image is an RGB 3ch image, the "grayscale conversion (achromatic conversion)" may be calculated, for example, as Y=0.3R+0.5G+0.1B.

The "target area (mark sheet area block) search and extraction process" may, for example, locate a rectangular area and extract the rectangular area as a mark sheet area image, or extract the mark sheet area image by using a mask in a case in which the range of the mark sheet area image is known in advance in the mark sheet information 14*b*.

Of the pre-processing in S101, processing other than the "target area (mark sheet area block) search and extraction process" may be performed at the page size of the input mark sheet image before the mark sheet area image is cut out from the input mark sheet image by the "target area (mark sheet area block) search and extraction process", or may be performed on the mark sheet area image after the mark sheet area image is cut out from the input mark sheet image by the "target area (mark sheet area block) search and extraction process".

Figure 4:
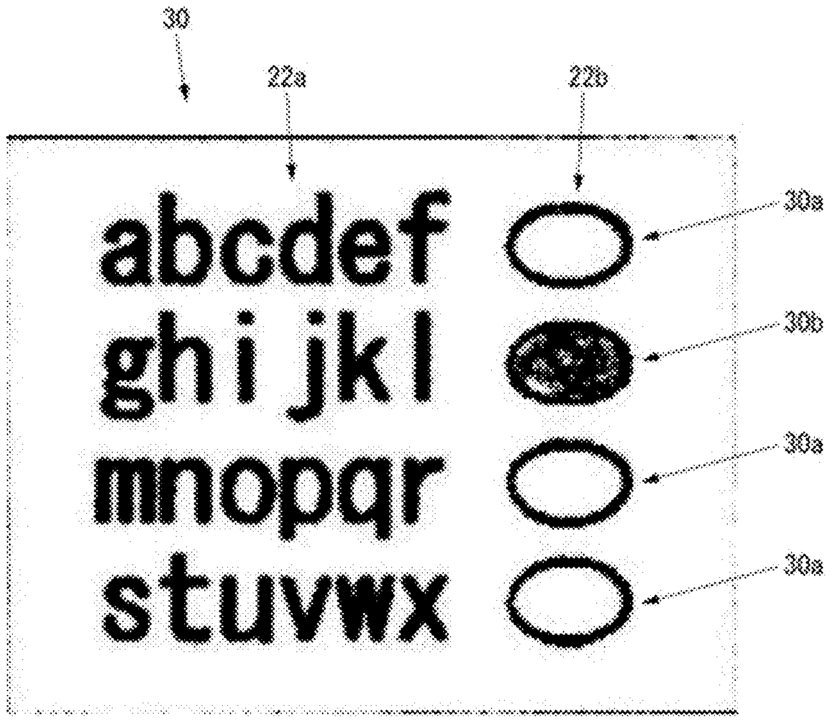
FIG. 4 is a diagram showing an example of a mark sheet area image generated by pre-processing shown in FIG. 3.

FIG. 4 is a diagram showing an example of the mark sheet area image generated by the pre-processing in S101.

The mark sheet area image 30 shown in FIG. 4 is an image of the topmost second attribute mark sheet area 22 among the plurality of second attribute mark sheet areas 22 in the mark sheet 20 shown in FIG. 2. The mark sheet area image 30 shown in FIG. 4 includes four character strings 22*a* and four frames 22*b*. Of the four frames 22*b*, the first, third and fourth frames 22*b* from the top are frames whose insides are not filled in (hereinafter referred to as "blank frames") 30*a*. Of the four frames 22*b*, the second frame 22*b* from the top is a filled-in frame 30*b*.

The image processing portion 15*a*, by the pre-processing in S101, generates not only an image of the attribute mark sheet area 22 second from the top among the plurality of second attribute mark sheet areas 22 in the mark sheet 20, but also images of each of the second attribute mark sheet areas 22 other than the attribute mark sheet area 22 second from the top among the plurality of second attribute mark sheet areas 22 in the mark sheet 20, and images of each of the plurality of first attribute mark sheet areas 21 in the mark sheet 20 by the pre-processing in S101 in the same manner as the mark sheet area images shown in FIG. 4.

Note that for ease of explanation, hereinafter, an image in which the background is substantially white and the characters and frames are substantially black will be referred to as a positive image.

As shown in FIG. 3, when the pre-processing in S101 ends, the image processing portion 15*a* executes a main process, which is a main part of the process for identifying an item corresponding to a filled-in frame from the mark sheet image (S102).

Figure 5:
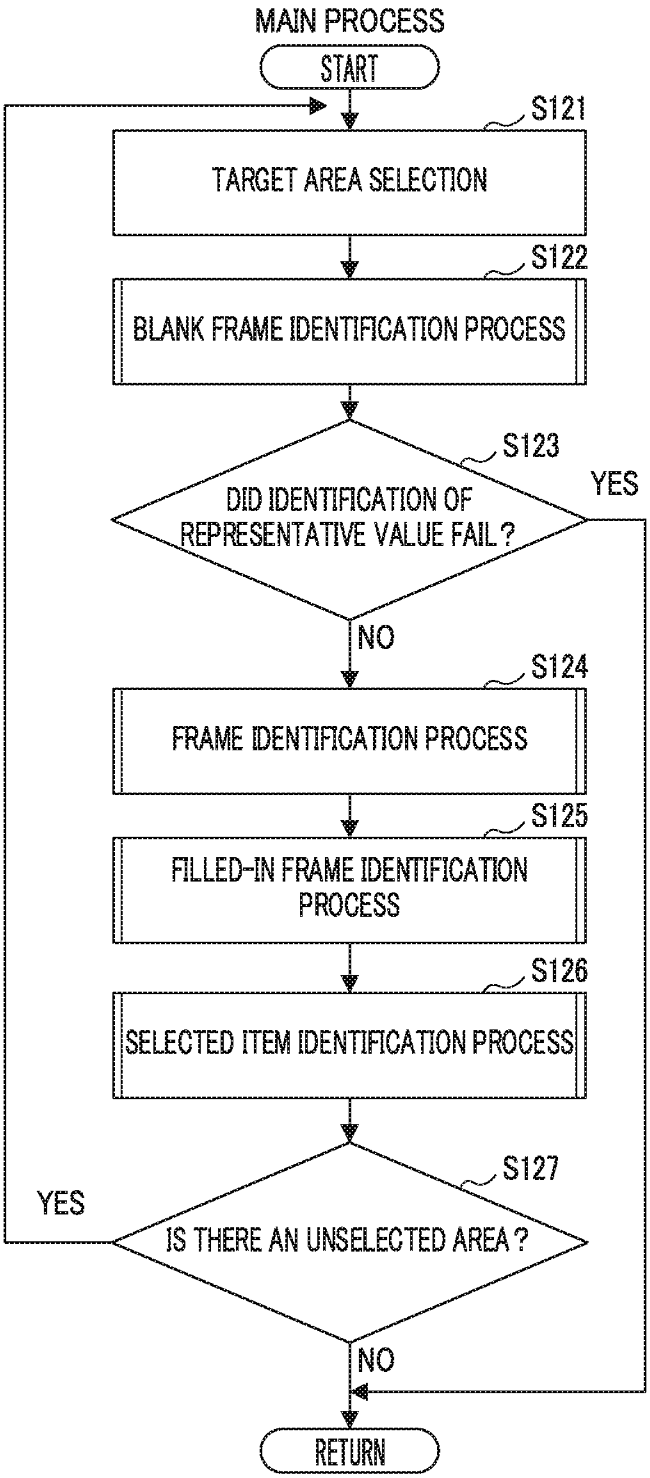
FIG. 5 is a flowchart of the main process shown in FIG. 3.

FIG. 5 is a flowchart of the main process shown in FIG. 3.

As shown in FIG. 5, the image processing portion 15*a* selects a target area from a plurality of mark sheet areas on the mark sheet 20 (S121). The target area is one of a plurality of mark sheet areas. The image processing portion 15*a* selects from among the plurality of mark sheet areas, one of the areas that has not yet been processed in the current main process as the target area.

When the process of S121 ends, the image processing portion 15*a* executes a blank frame identification process on the mark sheet area image of the current target area for identifying a blank frame in a direction perpendicular to the arrangement direction of the frames (S122).

Figure 6:
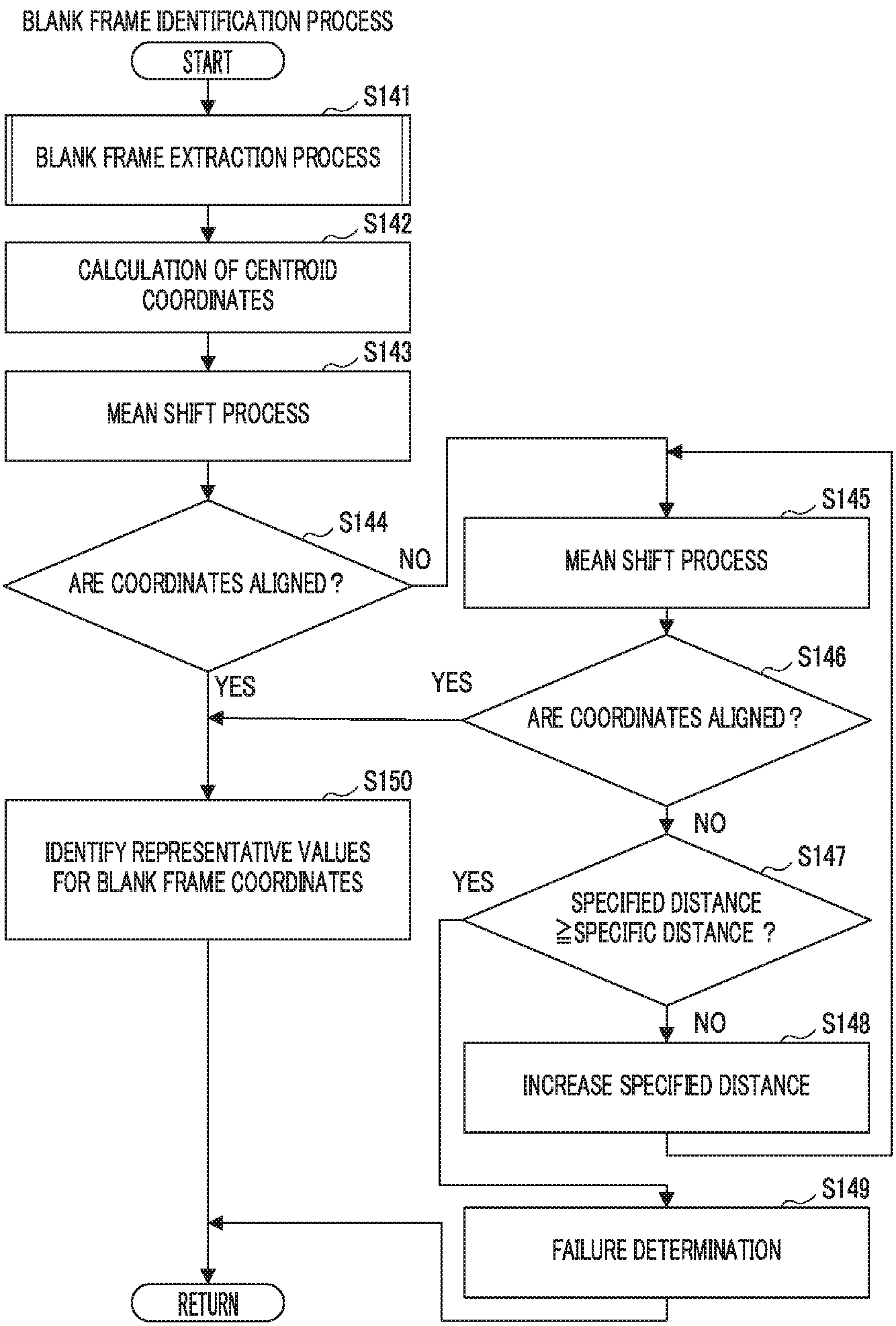
FIG. 6 is a flowchart of the blank frame identification process shown in FIG. 5.

FIG. 6 is a flowchart of the blank frame identification process shown in FIG. 5.

As shown in FIG. 6, the image processing portion 15*a* executes a blank frame extraction process for generating an image of only the blank frames from the mark sheet area image (S141).

Figure 7:
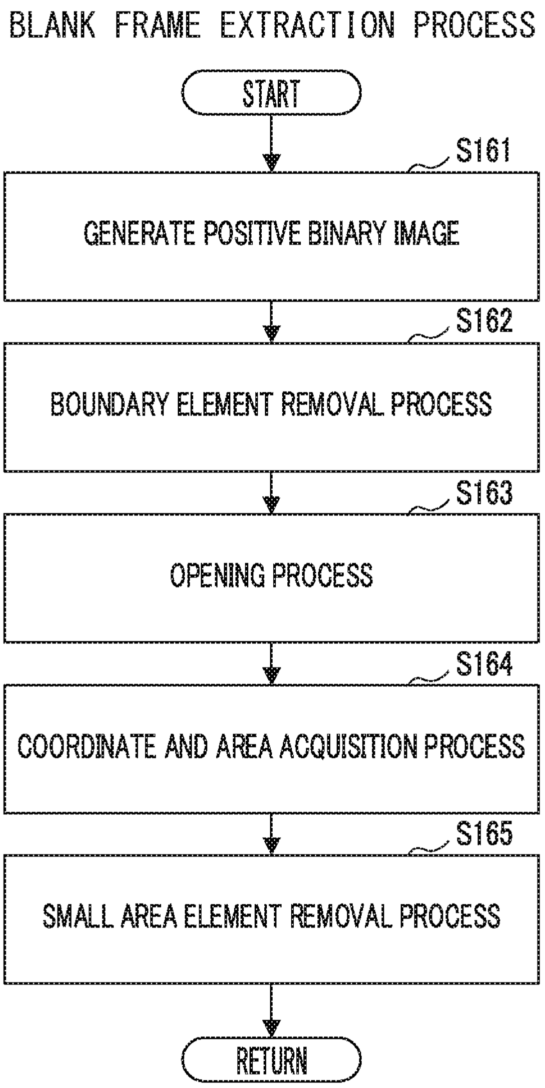
FIG. 7 is a flowchart of the blank frame extraction process shown in FIG. 6.

FIG. 7 is a flowchart of the blank frame extraction process shown in FIG. 6.

As shown in FIG. 7, the image processing portion 15*a* generates a binarized positive image (hereinafter referred to as a "positive binary image") of the mark sheet area image (S161). In a case in which the mark sheet area image generated by the pre-processing in S101 is a monochrome multi-value image, the image processing portion 15*a*, in S161, may determine a threshold value using, for example, an Otsu model and perform binarization. In a case in which the mark sheet area image generated by the pre-processing in S101 has already been binarized and the background is white and the foreground is black, that is, in a case in which the character strings and frames are black, the image processing portion 15*a* does not need to do anything in particular in S161. In a case in which the mark sheet area image generated by the pre-processing in S101 has already been binarized and is a binary image with a black background and a black foreground, that is, the character strings and frames are black, the image processing portion 15*a* performs a negative-positive inversion process in S161 so that the background becomes white, and generates a positive binary image with a white background.

Figure 8:
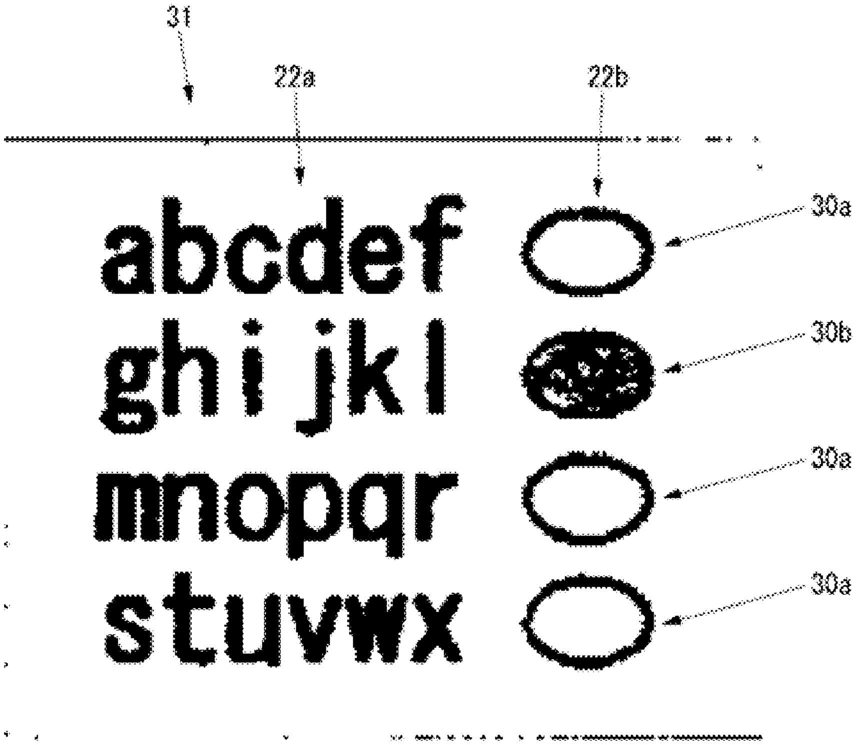
FIG. 8 is a diagram showing an example of a positive binary image of the mark sheet area image generated by the blank frame extraction process shown in FIG. 7.

FIG. 8 is a diagram showing an example of a positive binary image of the mark sheet area image generated by the blank frame extraction process shown in FIG. 7.

The positive binary image 31 shown in FIG. 8 is a positive binary image of the mark sheet area image 30 shown in FIG. 4.

As shown in FIG. 7, when the processing of S161 ends, the image processing portion 15*a* executes a boundary element removal process (S162) to remove elements that are in contact with the boundary of the positive binary image generated in S161. More specifically, for each pixel on the outer periphery of the positive binary image generated in S161, the image processing portion 15*a* searches for an adjacent pixel whose pixel value is white (hereinafter referred to as a "white pixel"). In a case in which an adjacent white pixel is found, the image processing portion 15*a* further searches for a white pixel adjacent to the found white pixel. After that, the image processing portion 15*a* repeats this process until no adjacent white pixels are found. Note that, as the method for searching for adjacent white pixels, it is possible to employ a 4-connected method in which a target pixel is searched for in a total of four directions, horizontal directions and vertical directions, or an 8-connected method in which, in addition to horizontal directions and vertical directions, searches in diagonal directions. In this manner, after the image processing portion 15*a* has extracted all consecutive white pixels from the white pixels on the periphery of the positive binary image of the mark sheet area image, the image processing portion 15*a* removes all consecutive white pixels from the white pixels on the periphery of the positive binary image, that is, replaces them with black pixels.

Figure 9:
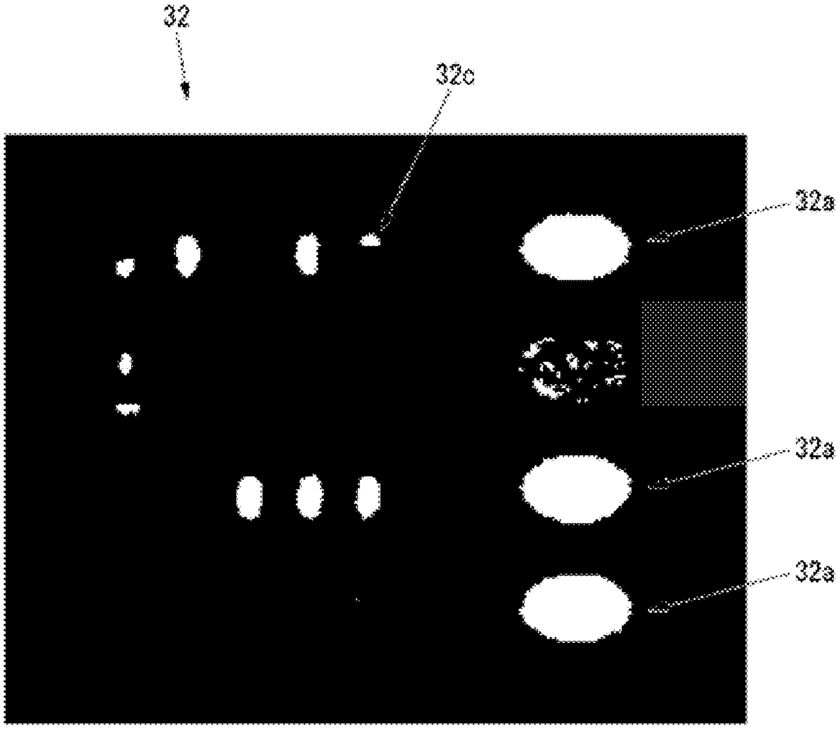
FIG. 9 is a diagram showing an example of an image obtained by removing all continuous white pixels from an outer periphery of the positive binary image shown in FIG. 8.

FIG. 9 is a diagram showing an example of an image obtained by removing all continuous white pixels from an outer periphery of the positive binary image shown in FIG. 8.

In the image 32 shown in FIG. 9, portions 32*a* inside of the frame 22*b* in the portion of the blank frames 30*a* in the positive binary image 31 shown in FIG. 8 remain white.

In a case in which the inside of the filled-in frame 30*b* in the mark sheet area is completely filled in, the inside of the frame is blackened at the time of binarization in S161, and thus, when the background is removed, that is, replaced with black by the process of S162, the filled-in frame 30*b* and the inside of this filled-in frame 30*b* blend in with the background and disappear. On the other hand, in a case in which there is an unfilled area inside the filled-in frame 30*b* of the mark sheet area, after the process of S162, only the unfilled portion remains white as shown in FIG. 9. However, the area of each of the plurality of unfilled portions is much smaller than the area of the portion 32*a* inside of a blank frame 30*a*, as shown in FIG. 9.

In addition, in a portion of the character string 22*a* of an item name that is paired with the frame 22*b*, only a portion 32*c* inside of a closed space within each character in the character string 22*a* remains white, as shown in FIG. 9. However, the area of each of the plurality of portions 32*c* is much smaller than the area of the portion 32*a* inside of the blank frame 30*a*, as shown in FIG. 9.

As shown in FIG. 7, when the boundary element removal process in S162 ends, the image processing portion 15*a* executes an Opening process (S163) in which an expansion process is performed after a reduction process on the image that has been subjected to execution of the boundary element removal process in S162. The Opening process can remove minute and very fine elements in an image. For example, in a case in which the resolution of the mark sheet area image is 300 dpi and the size of characters in the mark sheet area image is 10 points, an Opening process of, for example, 1px width to 2*px* width may be executed.

Figure 10:
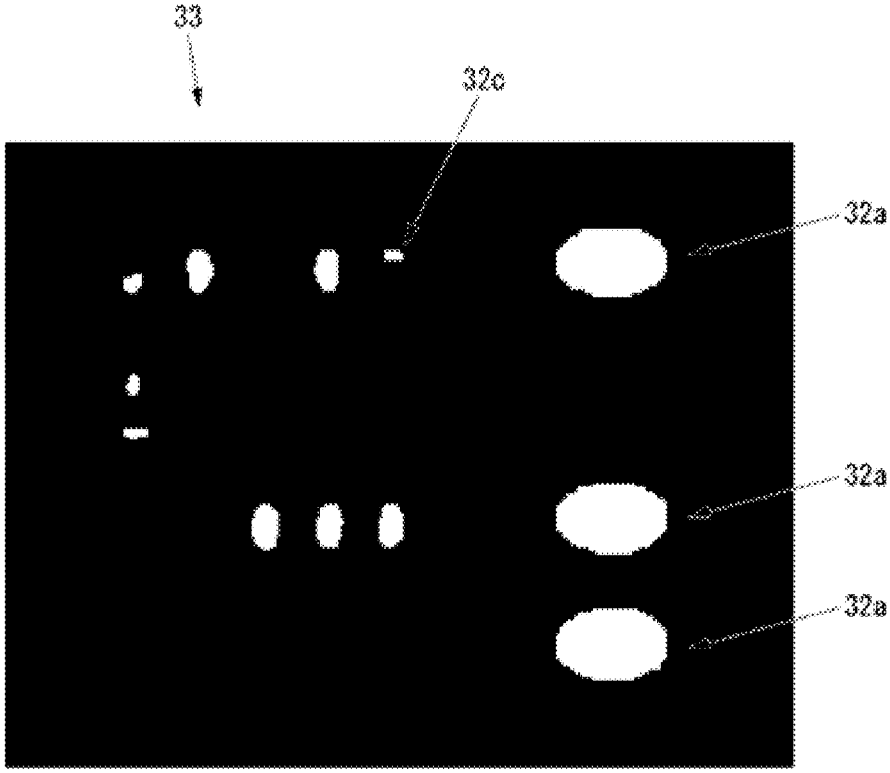
FIG. 10 is a diagram showing an example of an image obtained by executing an Opening process with a width of 1px on the image shown in FIG. 9.

FIG. 10 is a diagram showing an example of an image obtained by executing an Opening process with a width of 1px on the image shown in FIG. 9.

In the image 33 shown in FIG. 10, the minute elements and very fine elements in the image 32 shown in FIG. 9 have been removed. That is, in the image 33 shown in FIG. 10, the portion inside the filled-in frame 30*b* that is not filled in (see FIG. 8) has been entirely removed. In addition, in the image 33 shown in FIG. 10, a part of the portion 32*c* inside of the closed space in each character in the character string 22*a* (see FIG. 8) has been removed.

As shown in FIG. 7, when the Opening process in S163 ends, the image processing portion 15*a* executes a coordinate and area acquisition process on the image that has been subjected to the Opening process in S163 (S164). The coordinate and area acquisition process is a process for acquiring the coordinates and area of an image element that is an independent island-like cluster of white pixels. More specifically, the image processing portion 15*a* focuses on white pixels in the image, and after extracting the coordinate positions of the white pixels, determines the continuity of the white pixels, the coordinate positions of which have been extracted, with the pixels adjacent thereto, and extracts a cluster of white pixels. Furthermore, the image processing portion 15*a* finds the area of each cluster of white pixels from the number of pixels that constitute the cluster.

When the element coordinate and area acquisition process in S164 ends, the image processing portion 15*a* executes a small area element removal process for removing small area elements from the image on which the Opening process has been executed in S163 (S165). More specifically, the image processing portion 15*a* identifies the maximum area among the areas of each element in the image, and removes all elements whose area is equal to or less than a specific ratio less than 1 with respect to the maximum area from the image for which the Opening process has been performed in S163. The specific ratio in the small area element removal process may be, for example, 0.8. The term "removal" here essentially refers to a process of filling in the white parts in question black, blending them into the black background and making them invisible to the naked eye. In terms of image processing, this corresponds to replacing the pixel value of each element from a white color value to a black color value (background color).

Figure 11:
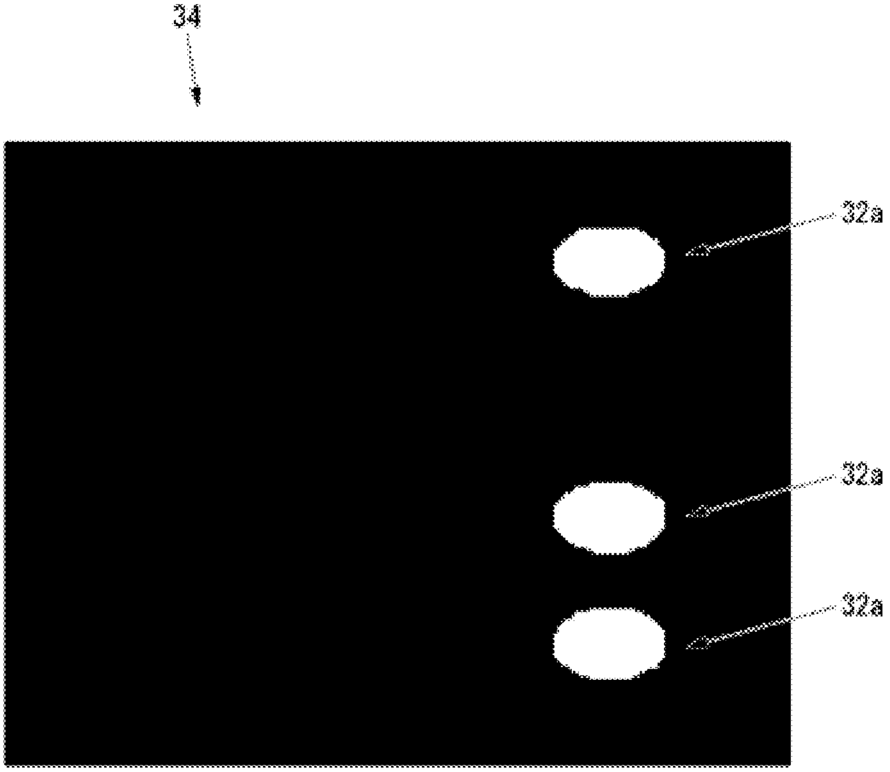
FIG. 11 is a diagram showing an example of an image obtained by executing a small area element removal process on the image shown in FIG. 10.

FIG. 11 is a diagram showing an example of an image obtained by executing a small area element removal process on the image shown in FIG. 10.

In the image 34 shown in FIG. 11, elements having small areas in the image 33 shown in FIG. 10 are removed. That is, in the image 34 shown in FIG. 11, the portion 32*c* inside of the closed space within each character in the character string 22*a* (see FIG. 8) has been removed.

In the image 33 shown in FIG. 10, it is clear that the element with the largest area is the portion 32*a* inside the blank frame 30*a* (see FIG. 4) in the mark sheet area image 30 (see FIG. 4). As long as there is no excessive aberration or distortion in the mark sheet area image 30, the area of the portion 32*a* inside of the blank frame 30*a* in the mark sheet area image 30 will be approximately the same no matter how many there are in the mark sheet area image 30. Therefore, even when a relatively high numerical value is set as the specific ratio in the small area element removal process of S165, the portion 32*a* inside of the blank frame 30*a* in the mark sheet area image 30 will not be removed, and as a result, the image processing portion 15*a* will not miss the portion 32*a* inside of the blank frame 30*a*.

Since a relatively high value can be set as the specific ratio in the small area element removal process of S165, elements other than the portions 32*a* inside the blank frames 30*a* in the mark sheet area image 30 are removed, and as a result, there is almost no possibility that the image processing portion 15*a* will erroneously extract an element other than the portion 32*a* inside the blank frame 30*a* as the portion 32*a* inside the blank frame 30*a*.

For example, as shown in FIG. 10, in a character string 22*a* (see FIG. 4) of an item name arranged in the vicinity of a frame 22*b* (see FIG. 4) and paired with the frame 22*b*, there may be small remaining elements after the Opening process of S163 is executed. However, since the area of such small remaining elements is far smaller than the area of the portion 32*a* inside of the blank frame 30*a*, the elements are removed by the small area element removal process of S165, that is, replaced with the same black color as the background color, as shown in FIG. 11.

In addition, even in a part of the filled-in frame 30*b* (see FIG. 4), in a case in which some areas have not been filled in carefully, small remaining elements may remain after the Opening process of S163 is executed, as shown in FIG. 10. However, since the area of such small remaining elements is far smaller than the area of the portion 32*a* inside of the blank frame 30*a*, the elements are removed by the small area element removal process of S165, that is, replaced with the same black color as the background color.

Therefore, in the image 34 after the small area element removal process in S165 has been executed, only the portions 32*a* inside the blank frames 30*a* remain, as shown in FIG. 11.

As shown in FIG. 7, when the small area element removal process in S165 ends, the image processing portion 15*a* ends the blank frame extraction process shown in FIG. 7.

As shown in FIG. 6, when the blank frame extraction process of S141 ends the image processing portion 15*a* calculates the coordinates of the centroid of each element, that is, each blank frame, for the image in a state in which only blank frames are remaining as a result of the blank frame extraction process of S141 (S142). For example, the image processing portion 15*a* may extract the coordinates of white pixels from an image that contains only blank frames as a result of the blank frame extraction process of S141, determine whether adjacent pixels are connected with the same color value, and extract clusters of white pixels that form islands, that is, elements, and may obtain, for each extracted frame, the arithmetic average of the x coordinates and the arithmetic average of the y coordinates of all the pixels of the frame as the x coordinate and the y coordinate of the centroid, respectively.

Figure 12:
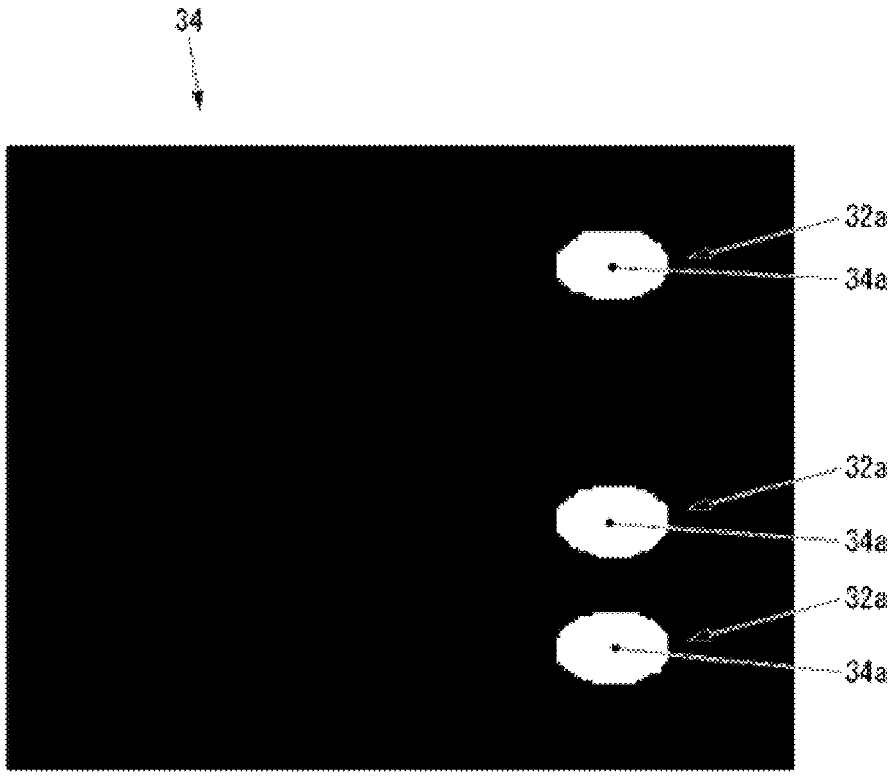
FIG. 12 is a diagram showing a centroid of each frame that is not filled in for the image shown in FIG. 11.

FIG. 12 is a diagram showing the centroids 34*a* of the blank frames 30*a* (see FIG. 4) for the image 34 shown in FIG. 11.

In FIG. 12, the x coordinates of the centroids 34*a* of the blank frames 30*a* are different.

As shown in FIG. 6, when the process of S142 ends, the image processing portion 15*a* performs a MeanShift process on each of the x coordinates and y coordinates of all the centroids whose coordinates have been calculated in S142 (S143).

The MeanShift process in S143 is a process in which, for each element in the sequence list, when there are other elements within a specified distance in the sequence list, the elements are replaced with the average value of those elements.

For example, when MeanShift process is performed on a sequence list of {1, 10, 0, 0, 2, 5, 6, 7, 6, 2, 1} with a specified distance of 2, the element "0" is replaced with "1", which is the average value of the elements "0", "1", "1", "2", and "2" that exist within the specified distance in the sequence list. For the element "1", since the elements "0", "0", "1", "2" and "2" exist as other elements within the specified distance in the sequence list, element "1" is replaced with "1", which is the average value of these elements. For the element "2", since the elements "0", "0", "1", "1" and "2" exist as other elements within the specified distance in the sequence list, element "2" is replaced with "1", which is the average value of these elements. For the element "5", since the elements "6", "6" and "7" exist as other elements within the specified distance in the sequence list, element "5" is replaced with "6", which is the average value of these elements. For the element "6", since the elements "5", "6" and "7" exist as other elements within the specified distance in the sequence list, element "6" is replaced with "6", which is the average value of these elements. For the element "7", since the elements "5", "6" and "6" exist as other elements within the specified distance in the sequence list, element "7" is replaced with "6", which is the average value of these elements. Therefore, when MeanShift processing is performed on a sequence list of {1, 10, 0, 0, 2, 5, 6, 7, 6, 2, 1} with a specified distance of 2, the sequence list becomes {1, 10, 1, 1, 1, 6, 6, 6, 6, 1, 1}.

In a case of performing the MeanShift process on the sequence list of {1, 10, 0, 0, 2, 5, 6, 7, 6, 2, 1} with a specified distance of 1, the element “0” is replaced with “½”, which is the average value of the elements “0”, “1”, and “1” that exist within the specified distance in the sequence list. For the element “1”, since the elements “0”, “0”, “1”, “2” and “2” exist as other elements within the specified distance in the sequence list, element “1” is replaced with “1”, which is the average value of these elements. For the element “2”, since the elements “1”, “1” and “2” exist as other elements within the specified distance in the sequence list, element “2” is replaced with “3/2”, which is the average value of these elements. For the element “5”, since the elements “6” and “6” exist as other elements within the specified distance in the sequence list, element “5” is replaced with “17/3”, which is the average value of these elements. For the element “6”, since the elements “5”, “6” and “7” exist as other elements within the specified distance in the sequence list, element “6” is replaced with “6”, which is the average value of these elements. For the element “7”, since the elements “6” and “6” exist as other elements within the specified distance in the sequence list, element “7” is replaced with “19/3”, which is the average value of these elements. Therefore, when the MeanShift process is performed on a sequence list of {1, 10, 0, 0, 2, 5, 6, 7, 6, 2, 1} with a specified distance of 1, the sequence list becomes {1, 10, ½, ½, 3/2, 17/3, 6, 19/3, 6, 3/2, 1}.

In a case of performing the MeanShift process on a sequence list of {1, 2, 3, 4, 5, 6, 7} with a specified distance of 1, for element “1”, since element “2” exists as the other element within the specified distance in the sequence list, element “1” is replaced with “3/2”, which is the average value of these elements. For element “2,” since the elements “1” and “3” exist as other elements within the specified distance in the sequence list, element “2” is replaced with “2,” which is the average value of these elements. For element “3,” since the elements “2” and “4” exist as other elements within the specified distance in the sequence list, element “3” is replaced with “3,” which is the average value of these elements. For element “4”, since the elements “3” and “5” exist as other elements within the specified distance in the sequence list, element “4” is replaced with “4”, which is the average value of these elements. For element “5”, since the elements “4” and “6” exist as other elements within the specified distance in the sequence list, element “5” is replaced with “5”, which is the average value of these elements. For element “6”, since the elements “5” and “7” exist as other elements within the specified distance in the sequence list, element “6” is replaced with “6”, which is the average value of these elements. For element “7”, since the element “6” exists as other element within the specified distance in the sequence list, element “7” is replaced with “13/2”, which is the average value of these elements. Therefore, when the MeanShift process is performed on the sequence list of {1, 2, 3, 4, 5, 6, 7} with a specified distance of 1, the sequence list becomes {3/2, 2, 3, 4, 5, 6, 13/2}.

In a case of performing the MeanShift process on a sequence list of {1, 2, 3, 4, 5, 6, 7} with a specified distance of 2, for element “1”, since the elements “2” and “3” exists as other elements within the specified distance in the sequence list, element “1” is replaced with “2”, which is the average value of these elements. For element “2”, since the elements “1”, “3” and “4” exist as other elements within the specified distance in the sequence list, element “2” is replaced with “5/2”, which is the average value of these elements. For element “3”, since the elements “1”, “2”, “4” and “5” exist as other elements within the specified distance in the sequence list, element “3” is replaced with “3”, which is the average value of these elements. For element “4”, since the elements “2”, “3”, “5” and “6” exist as other elements within the specified distance in the sequence list, element “4” is replaced with “4”, which is the average value of these elements. For element “5”, since the elements “3”, “4”, “6” and “7” exist as other elements within the specified distance in the sequence list, element “5” is replaced with “5”, which is the average value of these elements. For element “6”, since the elements “4”, “5” and “7” exist as other elements within the specified distance in the sequence list, element “6” is replaced with “11/2”, which is the average value of these elements. For element “7”, since the elements “5” and “6” exist as other elements within the specified distance in the sequence list, element “7” is replaced with “6”, which is the average value of these elements. Therefore, when the MeanShift process is performed on the sequence list of {1, 2, 3, 4, 5, 6, 7} with a specified distance of 2, the sequence list becomes {2, 5/2, 3, 4, 5, 11/2, 6}.

In a case of performing the MeanShift process on a sequence list of {1, 2, 3, 4, 5, 6, 7} with a specified distance of 3, for element “1”, since the elements “2”, “3”, and “4” exist as other elements within the specified distance in the sequence list, element “1” is replaced with “5/2”, which is the average value of these elements. For element “2”, since the elements “1”, “3”, “4” and “5” exist as other elements within the specified distance in the sequence list, element “2” is replaced with “3”, which is the average value of these elements. For element “3”, since the elements “1”, “2”, “4”, “5”, and “6” exist as other elements within the specified distance in the sequence list, element “3” is replaced with “7/2”, which is the average value of these elements. For element “4”, since the elements “1”, “2”, “3”, “5”, “6”, and “7” exist as other elements within the specified distance in the sequence list, element “4” is replaced with “4”, which is the average value of these elements. For element “5”, since the elements “2”, “3”, “4”, “6” and “7” exist as other elements within the specified distance in the sequence list, element “5” is replaced with “9/2”, which is the average value of these elements. For element “6”, since the elements “3”, “4”, “5” and “7” exist as other elements within the specified distance in the sequence list, element “6” is replaced with “5”, which is the average value of these elements. For element “7”, since the elements “4”, “5”, and “6” exist as other elements within the specified distance in the sequence list, element “7” is replaced with “11/2”, which is the average value of these elements. Therefore, when the MeanShift process is performed on the sequence list of {1, 2, 3, 4, 5, 6, 7} with a specified distance of 3, the sequence list becomes {5/2, 3, 7/2, 4, 9/2, 5, 11/2}.

The MeanShift process replaces each element in a sequence list with the average value of other elements within a specified distance in the sequence list, and thus replaces adjacent elements in a sequence list with the same value. Therefore, the MeanShift process has an effect of absorbing or suppressing variations in the sequence list. By repeating the MeanShift process multiple times, the elements in the sequence list converge to a constant value.

If the degree of residual amounts of distortion correction, horizontal adjustment, and vertical adjustment by the preprocessing in S101 is known, a distance slightly exceeding the residual amounts may be set as the specified distance in the MeanShift process, that is, as a correction distance. For example, in a case in which the resolution of the mark sheet area image is 300 dpi and the size of characters in the mark sheet area image is 10 points, a distance of, for example, about 5 px may be set as the initial value of the correction distance in the MeanShift process.

Figure 13:
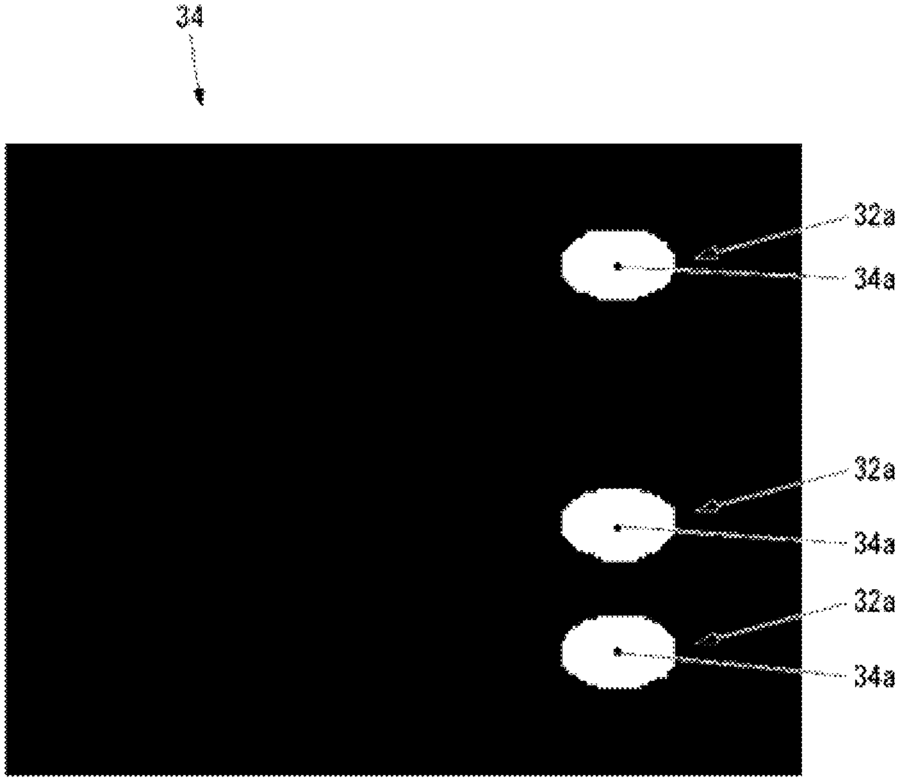
FIG. 13 is a diagram showing a state in which a dispersion in the centroid coordinates shown in FIG. 12 has been corrected.

FIG. 13 is a diagram showing a state in which a dispersion in the centroid coordinates shown in FIG. 12 has been corrected.

In FIG. 13, the x coordinates of the centroids 34*a* of all the blank frames 30*a* (see FIG. 4) are the same.

As shown in FIG. 6, when the process of S143 ends, the image processing portion 15*a* determines whether or not, of the x and y coordinates of the plurality of centroids that were subjected to the MeanShift process in S143, the coordinates in a direction perpendicular to an arrangement direction of the frames shown in the mark sheet information 14*b* for the current target area (S144) are aligned. For example, in a case in which the current target area is the first attribute mark sheet area 21 (see FIG. 2), the image processing portion 15*a* determines whether or not, of the x and y coordinates of the plurality centroids that were subjected to the MeanShift process in S143, the coordinates in the up-down direction perpendicular to the left-right direction in which the frames are arranged in the mark sheet information 14*b* for the first attribute mark sheet area 21, in other words, the y coordinates, are aligned. In addition, in a case in which the current target area is the second attribute mark sheet area 22 (see FIG. 2), the image processing portion 15*a* determines whether or not, of the x and y coordinates of the plurality centroids that were subjected to the MeanShift process in S143, the coordinates in the left-right direction perpendicular to the up-down direction in which the frames are arranged in the mark sheet information 14*b* for the second attribute mark sheet area 22, in other words, the x coordinates, are aligned.

When it is determined in S144 that, of the x and y coordinates of the plurality centroids that have been subjected to the MeanShift process in S143, the coordinates in the direction perpendicular to the arrangement direction of the frames shown in the mark sheet information 14*b* for the current target area are not aligned, the image processing portion 15*a* performs the MeanShift process again on the x and y coordinates of all the centroids that have been subjected to the MeanShift process in S143 (S145).

When the processing of S145 ends, the image processing portion 15*a* determines whether or not of the x and y coordinates of the plurality of centroids that were subjected to the MeanShift process in S145, the coordinates of the current target area in the direction perpendicular to the arrangement direction of the frames indicated in the mark sheet information 14*b* are aligned (S146).

When it is determined in S146 that of the x and y coordinates of the plurality of centroids that have been subjected to the MeanShift process in S145, the coordinates of the current target area in the direction perpendicular to the arrangement direction of the frames indicated in the mark sheet information 14*b* are not aligned, the image processing portion 15*a* determines whether or not the specified distance in the immediately preceding MeanShift process is equal to or greater than a specific distance (S147). For example, for the current target area, the specific distance in S147 may be a distance of half the width of the frames in the direction perpendicular to the arrangement direction of the frames shown in the mark sheet information 14*b*.

When it is determined in step S147 that the specified distance in the immediately preceding MeanShift process is not equal to or greater than a specific distance, the image processing portion 15*a* increases the specified distance in the MeanShift process from the current value by a specific value (S148), and executes the process of S145.

When it is determined in S147 that the specified distance in the immediately preceding MeanShift process is equal to or greater than a specific distance, the image processing portion 15*a* determines identifying a representative value of the coordinates of the blank frames in the direction perpendicular to the arrangement direction of the frames has failed (S149), and ends the blank frame identification process shown in FIG. 6.

When it is determined in S144 that, of the x and y coordinates of the plurality of centroids that have been subjected to the MeanShift process in S143, the coordinates in the direction perpendicular to the arrangement direction of the frames shown in the mark sheet information 14*b* for the current target area are aligned, the image processing portion 15*a* identifies, of the x and y coordinates of the plurality of centroids, whose variation has been corrected in S143, the coordinate in a direction perpendicular to the arrangement direction of the frames shown in the mark sheet information 14*b* for the current target area, as a representative value of the coordinates of the blank frames in the direction perpendicular to the arrangement direction of the frames (S150), and ends the blank frame identification process shown in FIG. 6.

Similarly, when it is determined in S146 that of the x and y coordinates of the plurality of centroids that have been subjected to the MeanShift process in S14, the coordinates of the current target area in a direction perpendicular to the arrangement direction of the frames shown in the mark sheet information 14*b* are aligned, the image processing portion 15*a* identifies, of the x and y coordinates of the plurality of centroids, whose variation has been corrected in S145, the coordinate in a direction perpendicular to the arrangement direction of the frames shown in the mark sheet information 14*b* for the current target area, as a representative value of the coordinates of the blank frames in the direction perpendicular to the arrangement direction of the frames (S150), and ends the blank frame identification process shown in FIG. 6.

As shown in FIG. 5, when the blank frame identification process of S122 ends, the image processing portion 15*a* determines whether or not it has been determined that the identification of the representative value of the coordinates of the blank frames in the direction perpendicular to the arrangement direction of the frames has failed (S123).

When it is determined in step S123 that the identification of the representative value of the coordinates of the blank frames in the direction perpendicular to the frame arrangement direction has failed, the image processing portion 15*a* ends the main process shown in FIG. 5.

When it is determined in step S123 that the determination of the representative value of the coordinates of the blank frames in the direction perpendicular to the arrangement direction of the frames has not failed, the image processing portion 15*a* executes a frame identification process for identifying frames on the mark sheet area image of the current target area (S124).

Figure 14:
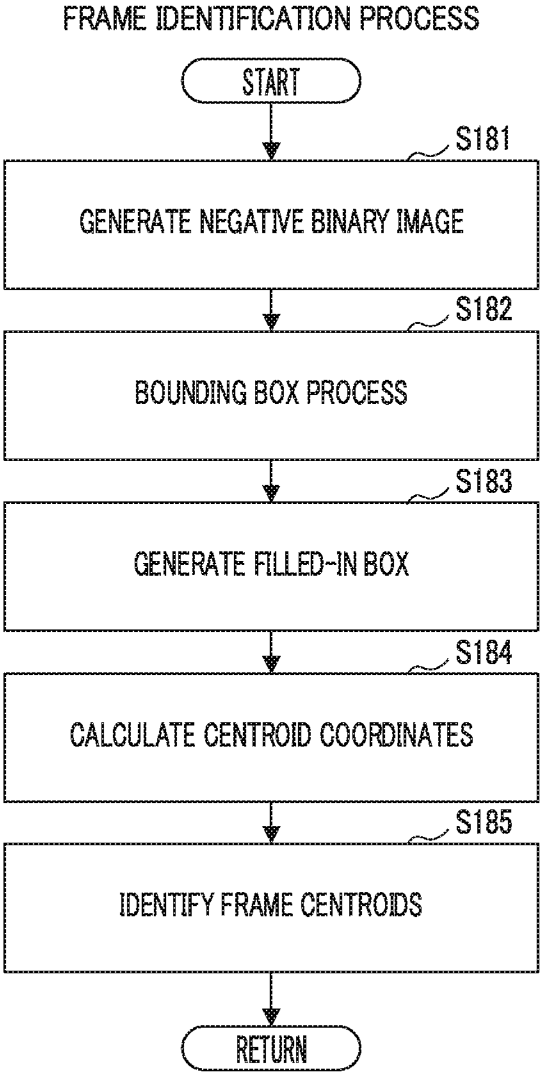
FIG. 14 is a flowchart of the frame identification process shown in FIG. 5.

FIG. 14 is a flowchart of the frame identification process shown in FIG. 5.

As shown in FIG. 14, the image processing portion 15*a* generates an image (hereinafter referred to as a "negative binary image") by inverting negative and positive of the positive binary image generated in S161 (see FIG. 7) (S181).

Figure 15:
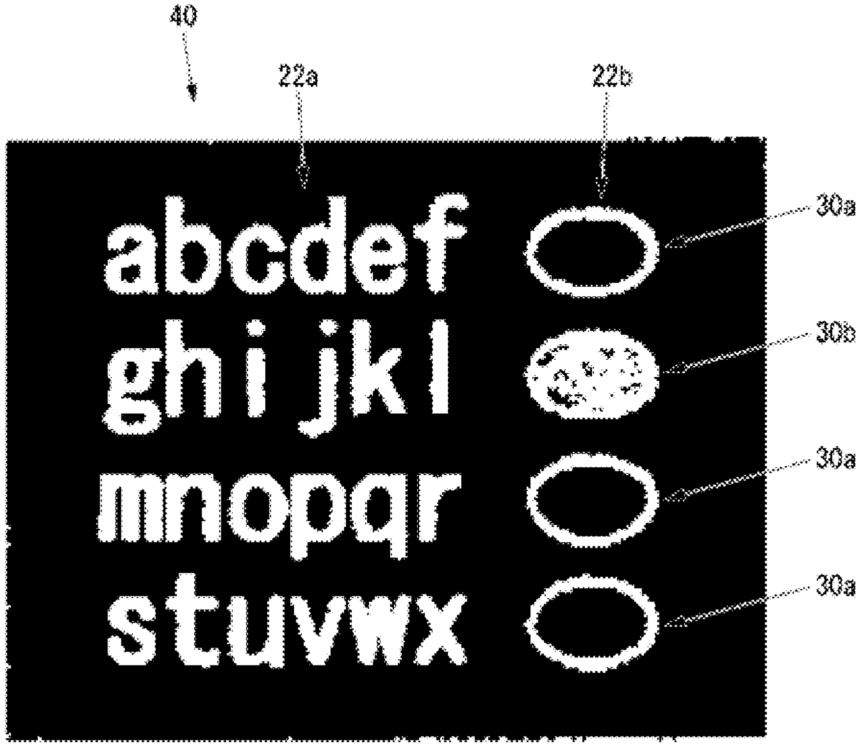
FIG. 15 is a diagram showing an example of a negative binary image generated by the frame identification process shown in FIG. 14.

FIG. 15 is a diagram showing an example of a negative binary image generated by the frame identification process shown in FIG. 14.

The negative binary image 40 shown in FIG. 15 is an image obtained by inverting the negative and positive of the positive binary image 31 shown in FIG. 8.

As shown in FIG. 14, the image processing portion 15*a* performs a bounding box process on the negative binary image generated in S181 (S182). The bounding box process is a process of surrounding elements in an image with a bounding box. Furthermore, the image processing portion 15*a* generates filled-in boxes by filling the inside of the bounding boxes generated in S182 with white (S183).

Figure 16:
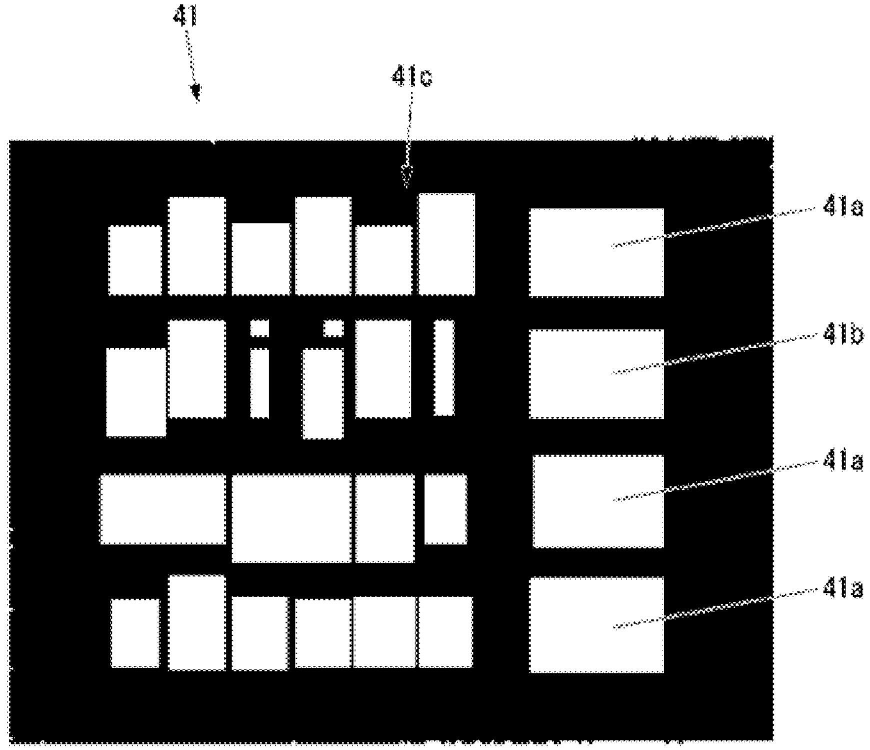
FIG. 16 is a diagram showing an example of an image including a box generated by the frame identification process shown in FIG. 14.

FIG. 16 is a diagram showing an example of an image including filled-in boxes generated by the frame identification process shown in FIG. 14.

The image 41 shown in FIG. 16 includes, for the negative binary image 40 shown in FIG. 15, filled-in boxes corresponding to bounding boxes enclosing elements within the image, that is, the blank frames 30*a*, the filled-in frame 30*b*, and all or part of each character of the character strings 22*a*. In FIG. 16, filled boxes 41*a*, 41*b*, and 41*c* are drawn. The filled-in boxes 41*a* correspond to bounding boxes that enclose the blank frames 30*a*. The filled-in box 41*b* corresponds to a bounding box that encloses the filled-in frame 30*b*. The filled-in boxes 41*c* correspond to bounding boxes that enclose all or part of each character of the character strings 22*a*.

As shown in FIG. 14, when the process of S183 ends, the image processing portion 15*a* calculates the coordinates of the centroids of the filled-in boxes generated in S183 (S184). For example, the image processing portion 15*a* may extract the coordinates of white pixels in the image in which filled-in boxes were generated in S183, determine whether or not adjacent pixels are connected with the same color value, and extract clusters of white pixels that form islands, that is, elements, and, for each extracted cluster, calculate an arithmetic average of the x coordinates and an arithmetic average of the y coordinates of all the pixels that make up the cluster as the x coordinate and y coordinate of the centroid, respectively. In addition, when the bounding box generated in S182 is defined as a rectangle by the coordinates of two diagonal vertices of the bounding box, the image processing portion 15*a* may calculate the centroid coordinates by averaging the coordinates of the two diagonal vertices of the bounding box. In addition, in a case in which the bounding box generated in S182 is defined by the coordinates, width, and height of one vertex of the bounding box, the image processing portion 15*a* may shift the coordinates of one vertex of the bounding box by half the width of the bounding box in the width direction of the bounding box and half the height of the bounding box in the height direction of the bounding box, as the centroid coordinates.

Figure 17:
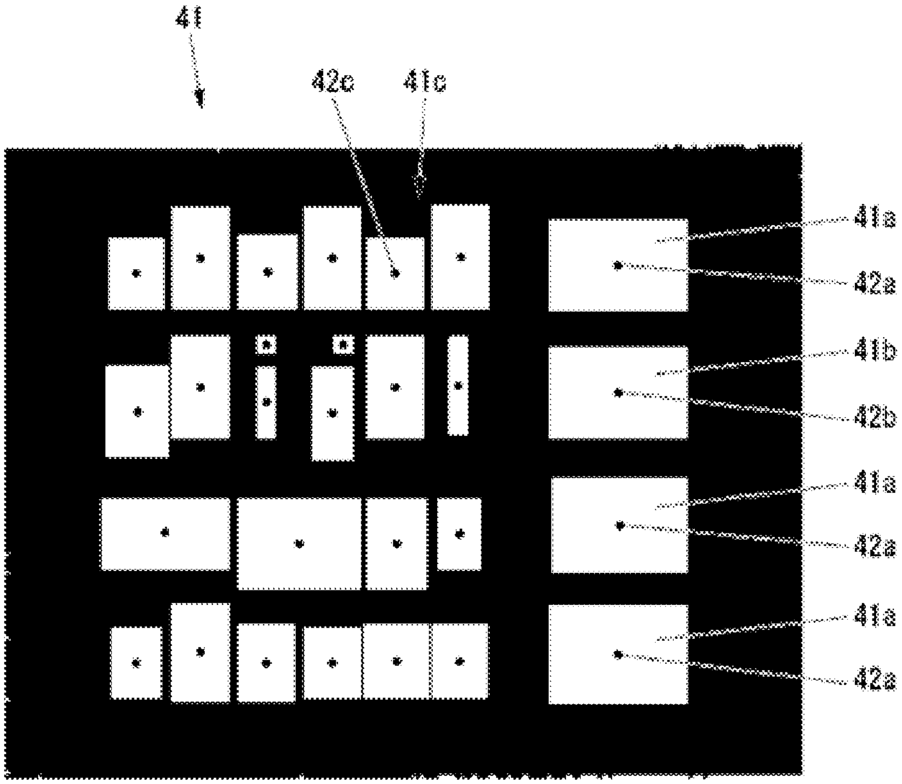
FIG. 17 is a diagram showing an example of a centroid of a box generated by the frame identification process shown in FIG. 14.

FIG. 17 is a diagram showing an example of the centroids of the filled-in boxes 41*a*, 41*b*, and 41*c* generated by the frame identification process shown in FIG. 14.

The centroids 42*a* shown in FIG. 17 are the centroids of the filled-in boxes 41*a* shown in FIG. 16. The centroid 42*b* shown in FIG. 17 is the centroid of the filled-in box 41*b* shown in FIG. 16. The centroids 42*c* shown in FIG. 17 are the centroids of the filled-in boxes 41*c* shown in FIG. 16.

A shown in FIG. 14, when the processing of S184 ends, the image processing portion 15*a* identifies from among the centroids whose coordinates were calculated in S184, the centroid that is within a specific distance from the representative coordinate of the blank frames in the direction perpendicular to the frame alignment direction, whose coordinate in the current target area in a direction perpendicular to the arrangement direction of the frames shown in the mark sheet information 14*b* was identified in S15 (see FIG. 6) as the centroid of the frame (S185). For example, for the current target area, the specific distance in S185 may be a distance of half the width of the box in the direction perpendicular to the arrangement direction of the boxes shown in the mark sheet information 14*b*.

Figure 18:
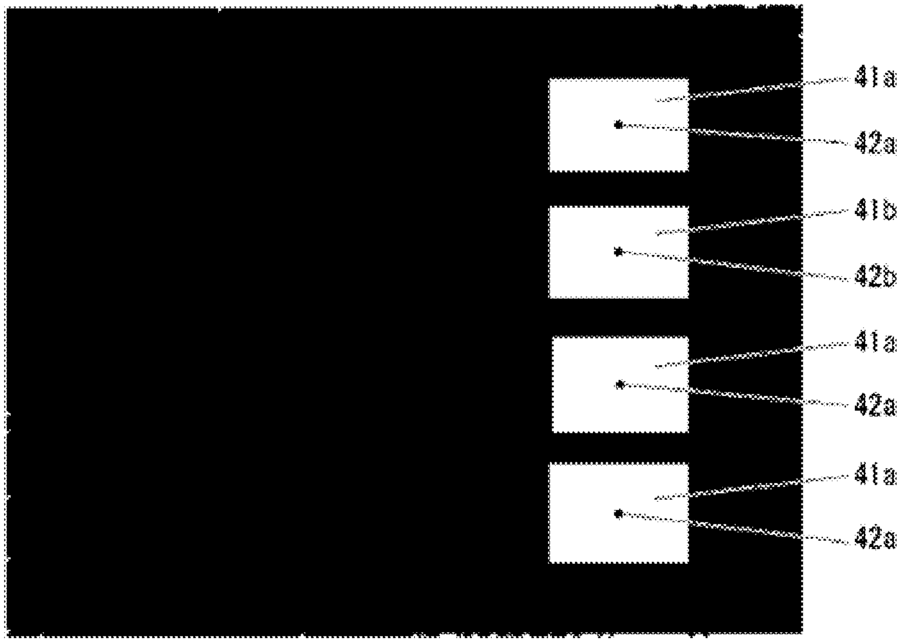
FIG. 18 is a diagram showing an example of a centroid of a box, corresponding to a frame, generated by the frame identification process shown in FIG. 14.

FIG. 18 is a diagram showing an example of the centroids of filled-in boxes corresponding to frames, which are generated by the frame identification process shown in FIG. 14.

The centroids shown in FIG. 18 are the centroids 42*a* and 42*b* from among the centroids 42*a* to 42*c* shown in FIG. 17 of the filled-in boxes 41*a* and 41*b* corresponding to the frames 22*b* (see FIG. 15). The centroids shown in FIG. 18 do not include the centroid 42*c* from among the centroids 42*a* to 42*c* shown in FIG. 17 of the filled-in boxes 41*c* that correspond to all or part of the characters of the character strings 22*a* (see FIG. 15). In other words, the centroids shown in FIG. 18 are obtained by excluding the centroids 42*c* from among the centroids 42*a* to 42*c* shown in FIG. 17 of the filled-in boxes 41*c* corresponding to all or part of the characters of the character strings 22*a*.

As shown in FIG. 14, when the process of S185 ends, the image processing portion 15*a* ends the frame identification process shown in FIG. 14.

As shown in FIG. 5, when the filled-in frame identification process of S124 ends, the image processing portion 15*a* executes a filled-in frame identification process for identifying a filled-in frame on the mark sheet area image of the current target area (S125).

Figure 19:
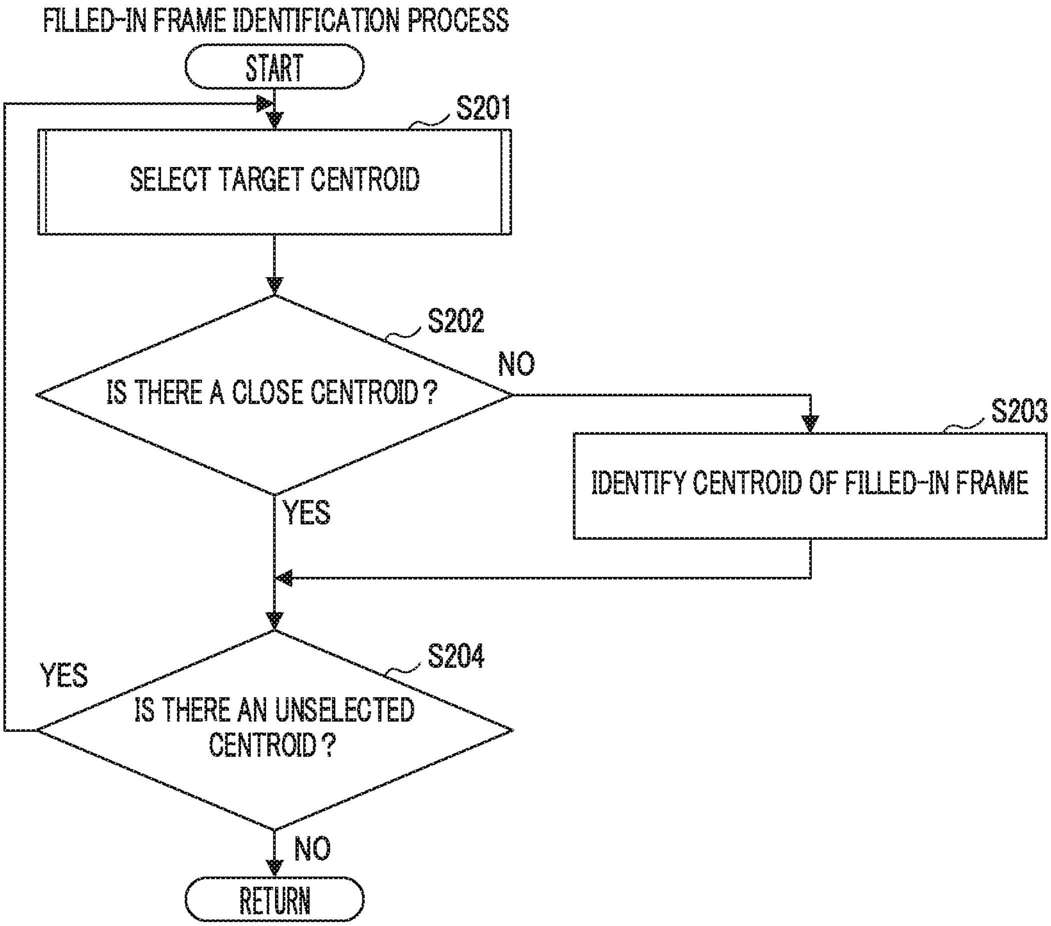
FIG. 19 is a flowchart of the filled-in frame identification process shown in FIG. 5.

FIG. 19 is a flowchart of the filled-in frame identification process shown in FIG. 5.

As shown in FIG. 19, the image processing portion 15*a* selects a target centroid from the centroids of the frames identified in S185 (S201). The target centroid is one of the centroids of the frames identified in S185. The target centroid is selected from among the centroids of the frames identified in S185 that have not yet been processed in the current filled-in frame identification process.

When the process of S201 ends, the image processing portion 15*a* determines whether or not a close centroid exists close to the centroid of the blank frame calculated in the blank frame identification process of S122 (S202). Of the centroids of blank frames calculated in the blank frame identification process of S122, a close centroid is one that is less than a specific distance away from the centroid of the current target frame.

When it is determined in S202 that a close centroid that is close to the blank frames calculated in the blank frame identification process of S122 does not exist, the image processing portion 15*a* identifies the centroid of the current target frame as the centroid of the filled-in frame (S203).

When it is determined in S202 that a close centroid exists close to the centroid of the blank frame calculated in the blank frame identification process in S122, or when the process of S203 ends, the image processing portion 15*a* determines whether or not there is an unselected centroid among the centroids of the frames identified in S185 (S204). An unselected centroid is a centroid of a frame identified in S185 that has not yet been processed in the current filled-in frame identification process.

When it is determined in S204 that an unselected centroid exists among the centroids of the frames identified in S185, the image processing portion 15*a* executes the process of S201.

When it is determined in S204 that there is no unselected centroid among the centroids of the frames identified in S185, the image processing portion 15*a* ends the filled-in frame identification process shown in FIG. 19.

Figure 20:
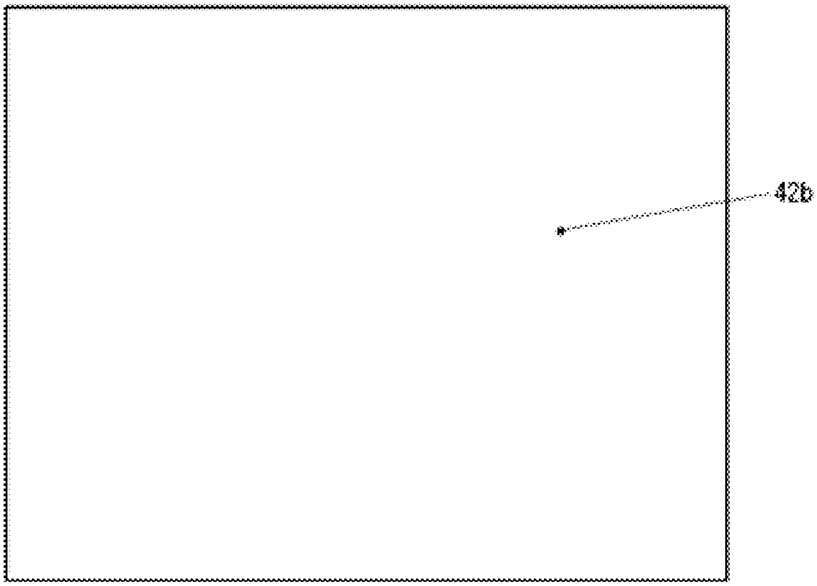
FIG. 20 is a diagram showing an example of a centroid of a filled-in frame identified in the filled-in frame identification process shown in FIG. 19.

FIG. 20 is a diagram showing an example of a centroid of a filled-in frame identified in the filled-in frame identification process shown in FIG. 19.

In a case in which the centroid of the blank frame calculated in the blank frame identification process of S122 is the centroid 34*a* shown in FIG. 13, and the centroids of the frames identified in S185 are the centroids 42*a*, 42*b* shown in FIG. 18, the image processing portion 15*a*, in the filled-in frame identification process shown in FIG. 19, identifies the centroid 42*b* shown in FIG. 20.

As shown in FIG. 5, when the filled-in frame identification process of S125 ends, the image processing portion 15*a* executes a selected item identification process for identifying a selected item on the mark sheet area image of the current target area (S126).

Figure 21:
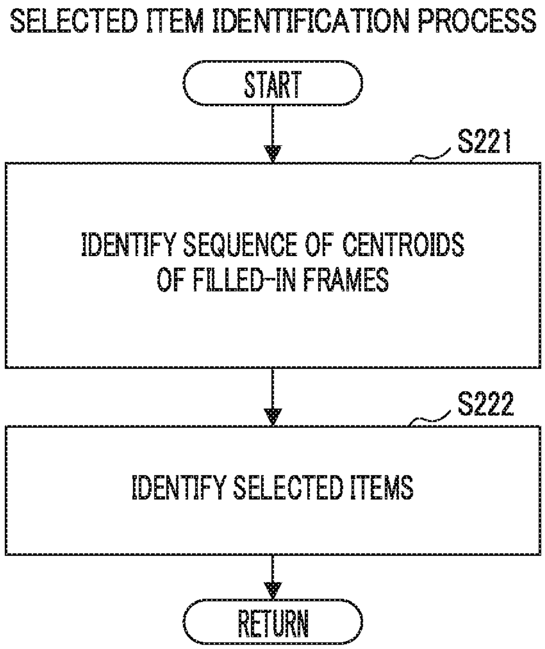
FIG. 21 is a flowchart of the selected item identification process shown in FIG. 5.

FIG. 21 is a flowchart of the selected item identification process shown in FIG. 5.

As shown in FIG. 21, the image processing portion 15*a* identifies a sequence of the centroids of the filled-in frames identified in the filled-in frame identification process of S125 among the centroids of all frames identified in S185 in the arrangement direction of the frames shown in the mark sheet information 14*b* for the current target area (S221).

For example, in a case in which the centroids of the frames identified in S185 are the centroids 42*a*, 42*b* shown in FIG. 18, and the centroid of the filled-in frame identified in the filled-in frame identification process of S125 is the centroid 42*b* shown in FIG. 20, the image processing portion 15*a* determines that in the arrangement direction of the frames shown in the mark sheet information 14*b* for the current target area, that is, in the y coordinate direction, the centroid coordinates of the filled-in frame identified in the filled-in frame identification process of S125 is the second from the top among the centroid coordinates of all the frames identified in S185.

When the process of S221 ends, the image processing portion 15*a*, based on the sequence specified in S221 and a frame item correspondence list stored in the mark sheet information 14*b* for the current target area, identifies the item corresponding to the filled-in frame whose centroid has been identified in the filled-in frame identification process of S125 as a selected item (S222).

When the process of S222 ends, the image processing portion 15*a* ends the selected item identification process shown in FIG. 21.

As shown in FIG. 5, when the selected item identification process in S126 ends, the image processing portion 15*a* determines whether or not there is an unselected area among the plurality of mark sheet areas on the mark sheet 20 (S127). The unselected area is an area from among the plurality of mark-sheet areas that has not yet been selected as a target area in the current main process.

When it is determined in step S127 that an unselected area exists among the plurality of mark sheet areas on the mark sheet 20, the image processing portion 15*a* executes the process of S121.

When it is determined in S127 that there is no unselected area among the plurality of mark sheet areas on the mark sheet 20, the image processing portion 15*a* ends the main process shown in FIG. 5.

As shown in FIG. 3, when the main process of S102 ends, the image processing portion 15*a* executes post-processing of the main process (S103).

Figure 22:
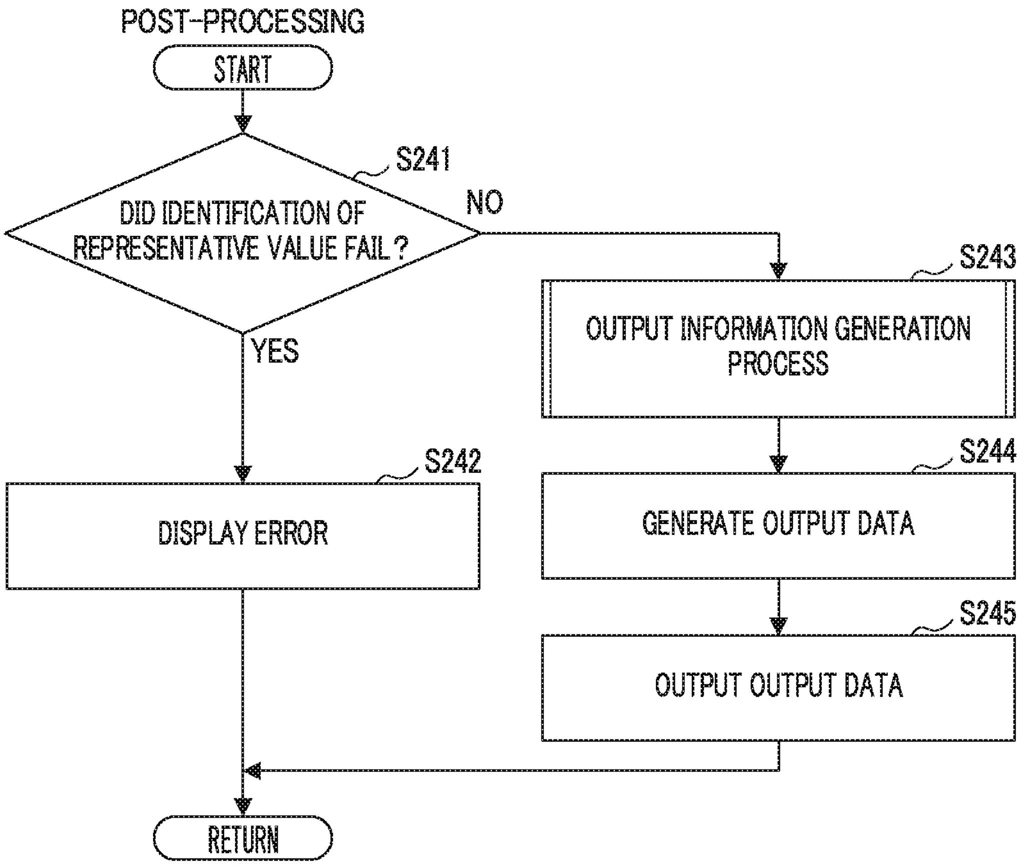
FIG. 22 is a flowchart of post-processing shown in FIG. 3.

FIG. 22 is a flowchart of post-processing shown in FIG. 3.

As shown in FIG. 22, the image processing portion 15*a* determines whether or not it has been determined in the main process of S102 that identification of a representative value of the coordinates of blank frames in a direction perpendicular to the arrangement direction of the frames has failed (S241).

When it is determined in S241 that the main process of S102 has failed to identify the representative values of the coordinates of the blank frames in the direction perpendicular to the arrangement direction of the frames, the image processing portion 15*a* displays an error on the display portion 12 (S242), and ends the post-processing shown in FIG. 22.

When it is determined in S241 that the main process of S102 has not failed to identify the representative values of the coordinates of the blank frames in the direction perpendicular to the arrangement direction of the frames, the image processing portion 15*a* executes an output information generation process for generating information to be output to subsequent processes (hereinafter referred to as "output information") (S243).

Figure 23:
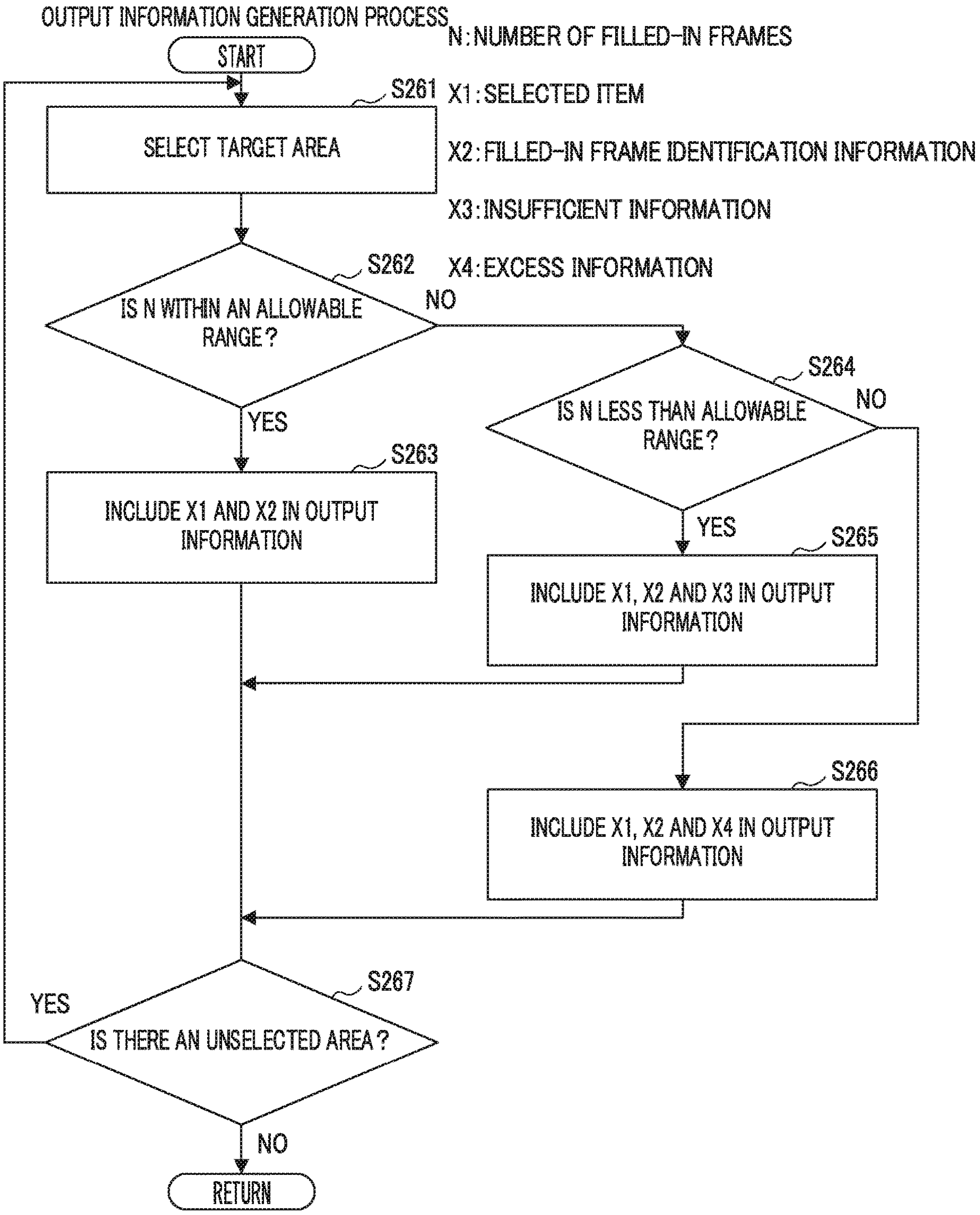
FIG. 23 is a flowchart of an output information generation process shown in FIG. 22.

FIG. 23 is a flowchart of an output information generation process shown in FIG. 22.

As shown in FIG. 23, the image processing portion 15*a* selects a target area from among a plurality of mark sheet areas on the mark sheet 20 that have not yet been targeted in the current output information generation process (S261).

When the process of S261 ends, the image processing portion 15*a* determines whether or not the number of filled-in frames identified in the main process of S102 for the current target area is within an allowable range based on the mark sheet information 14*b* (S262).

When it is determined in S262 that the number of filled-in frames identified in the main process of S102 for the current target area is within the allowable range, the image processing portion 15*a* includes the selected item and filled-in frame identification information for the current target area in the output information (S263). The selected item is the item identified in the selected item identification process of S126. The filled-in frame identification information is information for identifying the filled-in frame corresponding to the selected item. For example, the filled-in frame identification information may be the centroid coordinates of the filled-in frame, may be coordinates of two diagonal vertices of the bounding box of the filled-in frame, or may be coordinates of one vertex, as well as the width and height, of the bounding box of the filled-in frame.

When it is determined in S262 that the number of filled-in frames identified in the main process of S102 for the current target area is not within the allowable range, the image processing portion 15*a* determines whether or not the number of filled-in frames identified in the main process of S102 for the current target region is less than an allowable range (S264).

When it is determined in S264 that the number of filled-in frames identified in the main process of S102 for the current target area is less than the allowable range, the image processing portion 15*a* includes in the output information for the current target area the selection items identified in the selected item identification process of S126, the filled-in frame identification information corresponding to these selected items, and insufficient information (S265). The Insufficient information is information that indicates that the number of filled-in frames is less than the allowable range.

When it is determined in S264 that the number of filled-in frames identified in the main process of S102 for the current target area is not less than the allowable range, the image processing portion 15*a* includes in the output information for the current target area, the selected items identified in the selected item identification process of S126, the filled-in frame identification information corresponding to these selected items, and excess information (S266). The excess information is information that indicates that the number of filled-in frames is greater than the allowable range.

When the process of S263, S265 or S266 ends, the image processing portion 15*a* determines whether or not there is an unselected area among the plurality of mark sheet areas on the mark sheet 20 (S267). An unselected area is an area among the plurality of mark sheet areas that has not yet been selected as a target area in the current output information generation process.

When it is determined in step S267 that an unselected area exists among the plurality of mark sheet areas on the mark sheet 20, the image processing portion 15*a* executes the process of S261.

When it is determined in S267 that there is no unselected area among the plurality of mark sheet areas on the mark sheet 20, the image processing portion 15*a* ends the output information generation process shown in FIG. 23.

As shown in FIG. 22, when the output information generation process of S243 ends, the image processing portion 15*a* generates output data in a specific output format based on the output information generated in S243 (S244). For example, in a case in which the output information includes a plurality of overlapping selected items that can be combined into one, the image processing portion 15*a* may combine these selected items into one. In addition, in a case in which the output information includes a plurality of selected items whose sequence should be changed, the image processing portion 15*a* may change the sequence of these selected items to an appropriate sequence. Moreover, the image processing portion 15*a* may set the file format of the output data to a specific format, such as comma-delimited text, tab-delimited text, XML format, or JSON format.

When the process of S244 ends, the image processing portion 15*a* outputs the output data generated in S244 to a specific output destination (S245). For example, the image processing portion 15*a* may write the output data generated in S244 to the storage portion 14, or may execute a display via the display portion 12 based on the output data generated in S244.

When the process of S245 ends, the image processing portion 15*a* ends the post-processing shown in FIG. 22.

As shown in FIG. 3, when the post-processing of S103 ends, the image processing portion 15*a* ends the operation shown in FIG. 3.

There are cases in which the image processing portion 15*a* fails to identify a selected item. Therefore, there are cases in which a person checks whether or not the processing contents by the image processing portion 15*a* are correct or not. Therefore, the image processing portion 15*a*, in order to facilitate the confirmation work of the person confirming the processing contents by the image processing portion 15*a*, may cut out the filled-in frame portion from the mark sheet image or various types of images generated in the operation shown in FIG. 3 and display cut out portion on the display portion 12, may display an image for highlighting the centroid or the bounding box of the filled-in frame on the display portion 12 by superimposing the image on the mark sheet image or on various types of images generated in the operation shown in FIG. 3, or may superimpose an image for highlighting the character string of the item corresponding to the filled-in frame on the display portion 12, on the mark sheet image or on various types of images generated in the operation shown in FIG. 3.

Figure 24:
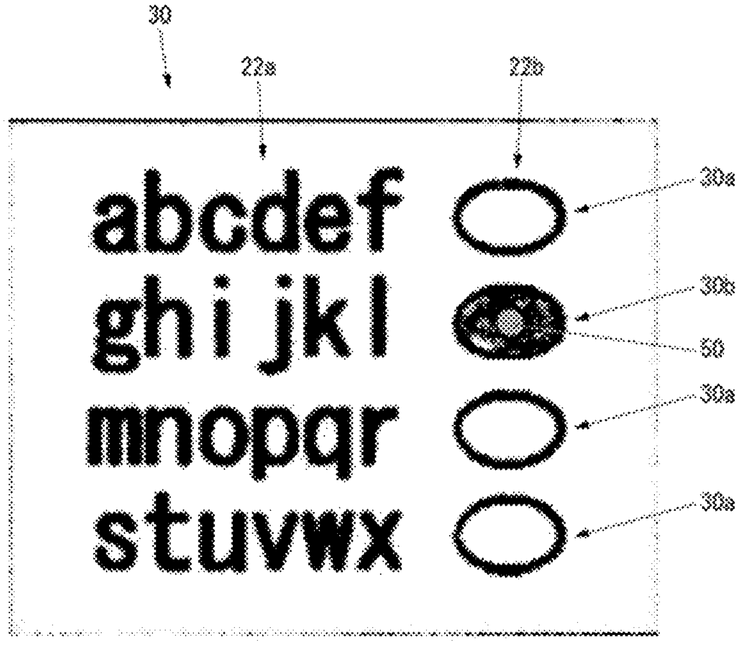
FIG. 24 is a diagram showing an example of a mark sheet area image on which an image for highlighting a centroid of a filled-in frame identified by the filled-in frame identification process shown in FIG. 19 is superimposed.

FIG. 24 is a diagram showing an example of a mark sheet area image on which an image for making the centroid of the filled-in frame stand out is superimposed.

In the mark sheet area image 30 shown in FIG. 24, an image 50 for highlighting the centroid of the filled-in frame 30*b* is superimposed on the filled-in frame 30*b*. Therefore, a person checking the processing contents by the image processing portion 15*a* can easily check that the filled-in frame 30*b* specified by the image processing portion 15*a* is correct by looking at the mark sheet area image 30 shown in FIG. 24.

As was described above, the image processing system 10 generates an image 33 (see FIG. 10) as a first image obtained by removing at least elements that are in contact with a boundary of the mark sheet area image 30 (see FIG. 4) from the mark sheet area image 30 (S162 to S163); generates an image 34 (see FIG. 11) as a second image obtained by removing at least a portion 32*c* (see FIG. 10) that is an element whose area is equal to or smaller than a specific ratio (less than 1) with respect to a portion 32*a* (see FIG. 10) that is an element whose area is the largest in the image 33 (S165); identifies the portion 32*a*, which is an element in the image 34, as a portion of the blank frame 30*a* (see FIG. 4), which is the frame 22*b* (see FIG. 4) whose inside is not filled in (S142); identifies boxes 41*a* and 41*b* (see FIG. 17), which are elements within the mark sheet area image 30 and whose positions in a direction perpendicular to the arrangement direction of the frame 22*b* are within a specific distance from the blank frame 30*a*, as boxes surrounding the frame 22*b* (S124); and identifies the frame 22*b* that does not have a corresponding blank frame 30*a* in terms of distance as a filled-in frame 30*b* (see FIG. 4), which is a frame whose inside is filled in (S125); and thus is better able to identify frames that are filled in than conventional methods.

The image processing system 10 identifies a selected item corresponding to a filled-in frame based on the position of the frame in the arrangement direction of the frames among the plurality of frames in the mark sheet area, a frame item correspondence list showing the correspondence between the frame and the item, and the position of the filled-in frame in the arrangement direction of the frames among the plurality of frames in the mark sheet area (S222), and thus is better able to identify a selected item that is selected in the mark sheet area than in conventional methods.

In the present embodiment, in a case in which it is determined in S147 that the specified distance in the MeanShift process in S143 is equal to or greater than a specific distance, the image processing system 10 displays an error (S242) and ends the operation shown in FIG. 3. However, in a case in which it is determined in S147 that the specified distance in the MeanShift process in S143 is equal to or greater than a specific distance, the image processing system 10 may correct the parameters of the pre-processing in S101 and start over from the pre-processing in S101, rather than displaying an error and ending the operation shown in FIG. 3. Note that in a case in which it is determined in S147 that the specified distance in the MeanShift process in S143 is equal to or greater than a specific distance, when the image processing system 10 corrects the parameters of the pre-processing in S101 and starts over from the pre-processing in S101, the image processing system 10 may warn that the pre-processing in S101 may be insufficient.

In the present embodiment, in a case in which it is determined in S147 that the specified distance in the MeanShift process in S143 is equal to or greater than a specific distance, the image processing system 10 determines that identifying the representative value of the coordinates of the blank frames in the direction perpendicular to the arrangement direction of the frames failed (S149). However, in a case in which it is determined in S147 that the specified distance in the MeanShift process in S143 is equal to or greater than a specific distance, the image processing system 10 may identify specific coordinates as the representative value of the coordinates of the blank frames in the direction perpendicular to the arrangement direction of the frames, without determining that identifying the representative value of the coordinates of the blank frames in the direction perpendicular to the arrangement direction of the frames failed, and then may en the blank frame identification process shown in FIG. 6. Here, the image processing system 10 may determine as the specific coordinates any one of the coordinates of the plurality of centroids that have been subjected to MeanShift processing in S145 in a direction perpendicular to the arrangement direction of the frames shown in the mark sheet information 14*b* for the current target area. For example, the image processing system 10 may determine as the specific coordinates the most frequent coordinates among the coordinates of the plurality of centroids that have been subjected to MeanShift processing in S145 in a direction perpendicular to the arrangement direction of the frames shown in the mark sheet information 14*b* for the current target area. Note that in a case in which it is determined in S147 that the specified distance in the MeanShift process in S143 is equal to or greater than a specific distance, the image processing system 10 may issue a warning when identifying specific coordinates as a representative value of the coordinates of blank frames in a direction perpendicular to the arrangement direction of the frames.

In the present embodiment, after executing the boundary element removal process in S162, the image processing system 10 executes the Opening process in S163 and then executes the element coordinate and area acquisition process in S164. However, if omitting the opening process of S163 does not have a significant impact on the final processing results, the image processing system 10 may execute the element coordinate and area acquisition process of S164 after executing the boundary element removal process of S162 without executing the Opening process of S163.

In the present embodiment, the image processing system 10 identifies a selected item corresponding to a filled-in frame from an image of a first attribute mark sheet area 21 which has a plurality of sets arranged in the left-right direction of a character string 21*a* representing an item and a frame 21*b* arranged immediately below the character string 21*a*, the inside of which is filled in when the item represented by the character string 21*a* immediately above is selected. However, the image processing system 10 may also use a similar method to identify a selected item corresponding to a filled-in frame from an image of a mark sheet area which has a plurality of sets arranged in the left-right direction of a character string representing an item and a frame arranged immediately above the character string, the inside of which is filled in when the item represented by the character string 21*a* immediately below is selected.

In the present embodiment, the image processing system 10 identifies a selected item corresponding to a filled-in frame from an image of a second attribute mark sheet area 22 which has a plurality of sets in the up-down direction of a character string 22*a* representing an item and a frame 22*b* arranged immediately to the right of the character string 22*a*, the inside of which is filled in when the item represented by the character string 22*a* to the immediately left is selected. However, the image processing system 10 may also use a similar method to identify a selected item corresponding to a filled-in frame from an image of a mark sheet area which has a plurality of sets arranged in the up-down direction of a character string representing an item and a frame arranged immediately to the left of the character string 22*a*, the inside of which is filled in when the item represented by the character string 22*a* to the immediately right is selected.

In the present embodiment, the image processing system 10 employs elliptical frames as frames on the mark sheet. However, as long as the frame is a closed frame, the image processing system 10 may also handle frames of shapes other than an ellipse. For example, the image processing system 10 may handle rectangular frames as frames on a mark sheet.

In the present embodiment, the image processing system 10 is configured with one computer. However, the image processing system 10 may be configured with a plurality of computers.

The image processing system according to the present disclosure generates a first image obtained by removing at least elements that are in contact with a boundary of an area image from the area image; generates a second image obtained by removing at least an element whose area is equal to or smaller than a specific ratio (less than 1) with respect to an element whose area is the largest in the first image; identifies an element in the second image as a blank frame whose inside is not filled in; identifies elements within the area image and whose positions in a direction perpendicular to an arrangement direction of the frames are within a specific distance from the blank frame as frames; and identifies a frame that does not have a corresponding blank frame in terms of distance as a filled-in frame whose inside is filled in; and thus is better able to identify frames whose inside is filled in than conventional methods.

The image processing system according to the present disclosure identifies an item corresponding to a filled-in frame based on a position of the frame in an arrangement direction of the frames among a plurality of frames in an area, a list showing correspondence with an item, and a position of the filled-in frame in the arrangement direction of the frames among the plurality of frames in the area, and thus is better able to identify an item that is selected in the area than in conventional methods.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing system comprising:

a processor; and memory configured to store instructions that, when executed by the processor, cause the processor to:

analyze a mark sheet that includes a plurality of sets of a character string representing an item, and a frame arranged in a first direction with respect to the respective character string and whose inside is filled in when the item represented by the character string is selected, the plurality of sets being arranged in a second direction perpendicular to the first direction; and identify a filled-in frame, which is the frame whose inside is filled in, from an area image that is an image of the area among images read from the mark sheet by an image reading device by:

generating a first image by removing from the area image at least elements that are in contact with a boundary of the area image;

generating a second image by removing from the first image at least elements whose area is equal to or smaller than a specific ratio, less than 1, of an area of the largest element in the first image;

identifying an element in the second image as a blank frame, whose inside is not filled in;

identifying an element among elements in the area image whose position in the first direction is within a specific distance of the position of the blank frame as the frame; and identifying the frame for which there is no corresponding blank frame within the specific distance as the filled-in frame.

2. The image processing system according to claim 1, wherein the memory further comprises instructions that, when executed by the processor, cause the processor to:

identify the item corresponding to the filled-in frame based on a list indicating correspondence between a position of the frame among a plurality of the frames in the area, and the item, and a position in the second direction of the filled-in frame among the plurality of frames in the area.

* * * * *